United States Patent
Chang et al.

(10) Patent No.: US 9,243,203 B2
(45) Date of Patent: Jan. 26, 2016

(54) COPOLYMERS OF POLYAMINOPOLYOLEFINS AND POLYANHYDRIDES AND METHODS OF THEIR PREPARATION

(71) Applicant: Chevron Oronite Company LLC, San Ramon, CA (US)

(72) Inventors: Young Chang, Santa Clara, CA (US); Casey Stokes, Belle Chasse, LA (US); David Morgan, Fairfield, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 348 days.

(21) Appl. No.: 13/691,628

(22) Filed: Nov. 30, 2012

(65) Prior Publication Data

US 2014/0155308 A1 Jun. 5, 2014

(51) Int. Cl.
| | | |
|---|---|---|
| C10M 159/12 | (2006.01) |
| C10M 149/12 | (2006.01) |
| C10M 149/10 | (2006.01) |
| C10M 149/02 | (2006.01) |
| C10M 149/18 | (2006.01) |
| C08F 8/00 | (2006.01) |
| C08G 81/02 | (2006.01) |
| C08G 73/10 | (2006.01) |

(52) U.S. Cl.
CPC ............... *C10M 149/10* (2013.01); *C08F 8/00* (2013.01); *C08G 73/105* (2013.01); *C08G 73/1042* (2013.01); *C08G 73/1046* (2013.01); *C08G 73/1082* (2013.01); *C08G 81/024* (2013.01); *C10M 149/02* (2013.01); *C10M 149/18* (2013.01); *C10M 2217/044* (2013.01); *C10N 2220/021* (2013.01); *C10N 2230/02* (2013.01); *C10N 2240/10* (2013.01); *C10N 2270/02* (2013.01)

(58) Field of Classification Search
CPC ..................... C10N 2030/02; C10N 2220/022; C10N 2230/02; C10M 159/12
USPC ........................... 508/454, 287–295, 232–235
See application file for complete search history.

(56) References Cited

U.S. PATENT DOCUMENTS

| | | | | |
|---|---|---|---|---|
| 4,045,400 A | * | 8/1977 | Korshak et al. ............... | 508/123 |
| 4,747,964 A | * | 5/1988 | Durand et al. ................ | 508/239 |
| 4,832,702 A | | 5/1989 | Kummer et al. | |
| 4,946,899 A | | 8/1990 | Kennedy et al. | |
| 5,047,160 A | * | 9/1991 | Emert et al. .................. | 508/232 |
| 5,104,944 A | | 4/1992 | Goldberg et al. | |
| 5,230,817 A | * | 7/1993 | Lundberg et al. ............. | 508/291 |
| 5,256,325 A | * | 10/1993 | Emert et al. .................. | 508/291 |
| 5,275,748 A | * | 1/1994 | Emert et al. .................. | 508/239 |
| 6,255,258 B1 | * | 7/2001 | Clark et al. ................... | 508/232 |
| 6,486,352 B1 | | 11/2002 | Gray | |
| 6,969,744 B2 | | 11/2005 | Stokes et al. | |
| 7,420,019 B2 | | 9/2008 | Stokes et al. | |
| 7,576,161 B2 | | 8/2009 | Stokes et al. | |
| 7,705,090 B2 | | 4/2010 | Stokes et al. | |
| 7,709,580 B2 | | 5/2010 | Stokes et al. | |
| 8,013,048 B2 | * | 9/2011 | Lin et al. ....................... | 524/440 |
| 8,013,073 B2 | | 9/2011 | Stokes et al. | |
| 8,063,154 B2 | | 11/2011 | Storey et al. | |
| 8,133,954 B2 | | 3/2012 | Stokes et al. | |
| 8,748,359 B2 | * | 6/2014 | Harrison et al. .............. | 508/291 |
| 8,859,473 B2 | * | 10/2014 | Harrison et al. .............. | 508/287 |
| 2009/0247716 A1 | | 10/2009 | Stokes et al. | |
| 2009/0258803 A1 | | 10/2009 | Harrison | |
| 2010/0099835 A1 | | 4/2010 | Stokes et al. | |
| 2010/0160193 A1 | * | 6/2010 | Harrison et al. .............. | 508/287 |
| 2010/0166820 A1 | | 7/2010 | Boden et al. | |
| 2010/0184918 A1 | | 7/2010 | Storey et al. | |
| 2010/0249001 A1 | | 9/2010 | Storey et al. | |
| 2010/0311915 A1 | | 12/2010 | Stokes et al. | |
| 2011/0028681 A1 | | 2/2011 | Storey et al. | |
| 2011/0288239 A1 | * | 11/2011 | Lin et al. ....................... | 525/327.6 |
| 2011/0306738 A1 | | 12/2011 | Stokes et al. | |
| 2011/0306745 A1 | | 12/2011 | Storey et al. | |
| 2012/0142868 A1 | | 6/2012 | Konig et al. | |
| 2013/0005918 A1 | * | 1/2013 | Lin et al. ....................... | 525/382 |
| 2014/0107001 A1 | * | 4/2014 | Saccomando et al. ........ | 508/287 |

OTHER PUBLICATIONS

Higashihara et al., "Synthesis of poly(isobutylene-block-methyl methacrylate) by a novel coupling approach," Macromolecules, 39:5275-5279 (2006).

Keki et al., "Aminotelechelics: A convenient synthesis and characterization of primary amino-terminated telechelic poly(propylene glycol) and polyisobutylene" J. Polymer Science: Part A: Polymer Chemistry, 42:587-596 (2004).

Koroskenyi et al, "Initiation via haloboration in living cationic polymerization. 6. A novel method for the synthesis of primary amine functional polyisobutylenes," J. Macromol. Chem. Pure Appl. Chem., A36:1879-1893 (1999).

Percec et al., "New Telechelic polymers and sequential copolymers by polyfunctional initiator-transfer agens (Inifers) 29. Synthesis of alpha,omega-di(amino)polysobutylenes," Polymer Bulletin, 9:27-32 (1983).

Ummadisetty et al., "Quantitative synthesis of novel polyisobutylenes fitted with termianl primary -Br, -Oh, -NH2, and methacrylate termini," J. Polymer Science: Part A: Polymer Chemistry, 46:4236-4242 (2008).

Wollyung et al., "Synthesis and mass spectrometry characterization of centrally and terminally amine-functionalized polyisobutylenes," J. Polymer Science: Part A: Polymer Chemistry, 43:946-958 (2005).

* cited by examiner

*Primary Examiner* — Ellen McAvoy
(74) *Attorney, Agent, or Firm* — Jones Day

(57) ABSTRACT

Provided herein are copolymers of a polyaminopolymer and polyanhydride, wherein the polyaminopolymer comprises a polyaminopolyolefin; and methods of their preparation.

49 Claims, No Drawings

COPOLYMERS OF POLYAMINOPOLYOLEFINS AND POLYANHYDRIDES AND METHODS OF THEIR PREPARATION

1. FIELD

Provided herein are copolymers of a polyamine and polyanhydride, wherein the polyamine comprises a polyaminopolyolefin; and methods of their preparation.

2. BACKGROUND

Lubricating oil for an internal combustion engine commonly contains additives to reduce and/or control deposits, wear, and/or corrosion. Similarly, liquid hydrocarbon fuels for an internal composition engine also commonly contain additives to control and/or reduce the formation of deposits. A polyolefin is useful as an additive in a fuel or lubricant as a viscosity modifier. To be useful as a viscosity modifier at both low and high temperatures, such a polymer must have a sufficient thickening effect on a light lubricating oil at high temperatures and a limited thickening effect on the light lubricating oil at low temperatures.

3. SUMMARY

Provided herein is a copolymer of a polyamine and polyanhydride, wherein the polyamine comprises a polyaminopolyolefin. In one embodiment, provided herein is a copolymer of a polyaminopolyolefin and polyanhydride. In another embodiment, provided herein is a copolymer of a polyaminopolyolefin, polyetheramine, and polyanhydride.

Also provided herein is a copolymer of a polyaminopolymer and polyanhydride, wherein the polyaminopolymer comprises a polyaminopolyolefin.

In one embodiment, the polyaminopolymer is a telechelic polyaminopolymer. In another embodiment, the polyaminopolyolefin is a telechelic polyaminopolyolefin. In yet another embodiment, the polyetheramine is a telechelic polyetheramine.

Provided herein is a copolymer of a telechelic polyaminopolymer and polyanhydride, wherein the telechelic polyaminopolymer comprises a telechelic polyaminopolyolefin. In one embodiment, provided herein is a copolymer of a telechelic polyaminopolyolefin and polyanhydride. In another embodiment, provided herein is a copolymer of a telechelic polyaminopolyolefin, telechelic polyetheramine, and polyanhydride.

In one embodiment, the polyaminopolyolefin is a quasi-living polyaminopolyolefin.

Additionally, provided herein is a copolymer of a polyamine and polyanhydride, wherein the polyamine comprises a quasi-living polyaminopolyolefin.

Provided herein is a copolymer of a polyaminopolymer and polyanhydride, wherein the polyaminopolymer comprises a quasi-living polyaminopolyolefin. In one embodiment, provided herein is a copolymer of a quasi-living polyaminopolyolefin and polyanhydride. In another embodiment, provided herein is a copolymer of a quasi-living polyaminopolyolefin, polyetheramine, and polyanhydride.

In one embodiment, the polyaminopolyolefin is a quasi-living telechelic polyaminopolyolefin.

Furthermore, provided herein is a copolymer of a telechelic polyaminopolymer and polyanhydride, wherein the telechelic polyaminopolymer comprises a quasi-living telechelic polyaminopolyolefin. In one embodiment, provided herein is a copolymer of a quasi-living telechelic polyaminopolyolefin and polyanhydride. In another embodiment, provided herein is a copolymer of a quasi-living telechelic polyaminopolyolefin, telechelic polyetheramine, and polyanhydride.

Provided herein is a copolymer of Formula A:

$$R^5 \mathrm{-\!\!\!-\!\!(X\!-\!Y)\!-\!\!\!_n X\!-\!R^6} \quad (A)$$

wherein:

each X is independently alkylene, cycloalkylene, arylene, heteroarylene, heterocyclylene, or a divalent polymer group, provided that at least one of the X groups is a divalent polyolefin group;

each Y is independently a divalent moiety containing two imido groups;

$R^5$ and $R^6$ are each independently amino, amido, or imido; and n is an integer ranging from about 1 to about 100.

Provided herein is a copolymer formed from the reaction of a polyamine with a polyanhydride, wherein the polyamine comprises a polyaminopolyolefin.

Provided herein is a copolymer formed from the reaction of a polyaminopolymer with a polyanhydride, wherein the polyaminopolymer comprises a polyaminopolyolefin.

Provided herein is a method for preparing a copolymer, comprising the step of reacting a polyamine with a polyanhydride, wherein the polyamine comprises a polyaminopolyolefin.

Provided herein is a method for preparing a copolymer, comprising the step of reacting a polyaminopolymer with a polyanhydride, wherein the polyaminopolymer comprises a polyaminopolyolefin.

Provided herein is a method for preparing a copolymer, comprising the step of reacting a polyamine with a polyanhydride in a solvent at an elevated temperature, wherein the polyamine comprises a polyaminopolyolefin. In one embodiment, the reacting step is performed in the presence of an end-capping reagent to form an end-capped copolymer.

Provided herein is a method for preparing a copolymer, comprising the step of reacting a polyaminopolymer with a polyanhydride in a solvent at an elevated temperature, wherein the polyaminopolymer comprises a polyaminopolyolefin. In one embodiment, the reacting step is performed in the presence of an end-capping reagent to form an end-capped copolymer.

Provided herein is a lubricant oil composition that comprises an oil of lubricating viscosity and a copolymer of a polyamine and polyanhydride, wherein the polyamine comprises a polyaminopolyolefin.

Provided herein is a lubricant oil composition that comprises an oil of lubricating viscosity and a copolymer of a polyaminopolymer and polyanhydride, wherein the polyaminopolymer comprises a polyaminopolyolefin.

Provided herein is a lubricant oil composition that comprising a major amount of an oil of lubricating viscosity and a minor amount of a copolymer of a polyamine and polyanhydride, wherein the polyamine comprises a polyaminopolyolefin.

Provided herein is a lubricant oil composition that comprising a major amount of an oil of lubricating viscosity and a minor amount of a copolymer of a polyaminopolymer and polyanhydride, wherein the polyaminopolymer comprises a polyaminopolyolefin.

4. DETAILED DESCRIPTION

4.1 Definitions

To facilitate understanding of the disclosure set forth herein, a number of terms are defined below.

Generally, the nomenclature used herein and the laboratory procedures in organic chemistry, polymer chemistry, and petroleum chemistry described herein are those well known and commonly employed in the art. Unless defined otherwise, all technical and scientific terms used herein generally have the same meaning as commonly understood by one of ordinary skill in the art to which this disclosure belongs.

The term "alkyl" refers to a linear or branched saturated monovalent hydrocarbon radical. In certain embodiments, the alkyl is optionally substituted, in one embodiment, with one or more substituents Q. The term "alkyl" also encompasses both linear and branched alkyl, unless otherwise specified. In certain embodiments, the alkyl is a linear saturated monovalent hydrocarbon radical that has 1 to 20 ($C_{1-20}$), 1 to 15 ($C_{1-15}$), 1 to 10 ($C_{1-10}$), 1 to 6 ($C_{1-6}$), or 1 to 3 ($C_{1-3}$) carbon atoms, or branched saturated monovalent hydrocarbon radical of 3 to 20 ($C_{3-20}$), 3 to 15 ($C_{3-15}$), 3 to 10 ($C_{3-10}$), or 3 to 6 ($C_{3-6}$) carbon atoms. As used herein, linear $C_{1-6}$ and branched $C_{3-6}$ alkyl groups are also referred as "lower alkyl." Examples of alkyl groups include, but are not limited to, methyl, ethyl, propyl (including all isomeric forms), n-propyl, isopropyl, butyl (including all isomeric forms), n-butyl, isobutyl, sec-butyl, t-butyl, pentyl (including all isomeric forms), and hexyl (including all isomeric forms). For example, $C_{1-6}$ alkyl refers to a linear saturated monovalent hydrocarbon radical of 1 to 6 carbon atoms or a branched saturated monovalent hydrocarbon radical of 3 to 6 carbon atoms.

The term "alkylene" refers to a linear or branched saturated divalent hydrocarbon radical, wherein the alkylene is optionally substituted with one or more substituents Q as described herein. The term "alkylene" encompasses both linear and branched alkylene, unless otherwise specified. In certain embodiments, the alkylene is a linear saturated divalent hydrocarbon radical that has 1 to 20 ($C_{1-20}$), 1 to 15 ($C_{1-15}$), 1 to 10 ($C_{1-10}$), or 1 to 6 ($C_{1-6}$) carbon atoms, or branched saturated divalent hydrocarbon radical of 3 to 20 ($C_{3-20}$), 3 to 15 ($C_{3-15}$), 3 to 10 ($C_{3-10}$), or 3 to 6 ($C_{3-6}$) carbon atoms. As used herein, linear $C_{1-6}$ and branched $C_{3-6}$ alkylene groups are also referred as "lower alkylene." Examples of alkylene groups include, but are not limited to, methylene, ethylene, propylene (including all isomeric forms), butylene (including all isomeric forms), pentylene (including all isomeric forms), and hexylene (including all isomeric forms). For example, $C_{1-6}$ alkylene refers to a linear saturated divalent hydrocarbon radical of 1 to 6 carbon atoms or a branched saturated divalent hydrocarbon radical of 3 to 6 carbon atoms.

The term "alkenyl" refers to a linear or branched monovalent hydrocarbon radical, which contains one or more, in one embodiment, one, two, three, four, or five, in another embodiment, one, carbon-carbon double bond(s). In certain embodiments, the alkenyl is optionally substituted, in one embodiment, with one or more substituents Q. The term "alkenyl" also embraces radicals having "cis" and "trans" configurations, or alternatively, "Z" and "E" configurations, as appreciated by those of ordinary skill in the art. As used herein, the term "alkenyl" encompasses both linear and branched alkenyl, unless otherwise specified. For example, $C_{2-6}$ alkenyl refers to a linear unsaturated monovalent hydrocarbon radical of 2 to 6 carbon atoms or a branched unsaturated monovalent hydrocarbon radical of 3 to 6 carbon atoms. In certain embodiments, the alkenyl is a linear monovalent hydrocarbon radical of 2 to 20 ($C_{2-20}$), 2 to 15 ($C_{2-15}$), 2 to 10 ($C_{2-10}$), 2 to 6 ($C_{2-6}$), or 2 to 3 ($C_{2-3}$) carbon atoms, or a branched monovalent hydrocarbon radical of 3 to 20 ($C_{3-20}$), 3 to 15 ($C_{3-15}$), 3 to 10 ($C_{3-10}$), or 3 to 6 ($C_{3-6}$) carbon atoms. Examples of alkenyl groups include, but are not limited to, ethenyl, propen-1-yl, propen-2-yl, allyl, butenyl, and 4-methylbutenyl.

The term "alkenylene" refers to a linear or branched divalent hydrocarbon radical, which contains one or more, in one embodiment, one, two, three, four, or five, in another embodiment, one, carbon-carbon double bond(s). In certain embodiments, the alkenylene is optionally substituted with one or more substituents Q as described herein. Similarly, the term "alkenylene" also embraces radicals having "cis" and "trans" configurations, or alternatively, "E" and "Z" configurations. As used herein, the term "alkenylene" encompasses both linear and branched alkenylene, unless otherwise specified. For example, $C_{2-6}$ alkenylene refers to a linear unsaturated divalent hydrocarbon radical of 2 to 6 carbon atoms or a branched unsaturated divalent hydrocarbon radical of 3 to 6 carbon atoms. In certain embodiments, the alkenylene is a linear divalent hydrocarbon radical of 2 to 20 ($C_{2-20}$), 2 to 15 ($C_{2-15}$), 2 to 10 ($C_{2-10}$), or 2 to 6 ($C_{2-6}$) carbon atoms, or a branched divalent hydrocarbon radical of 3 to 20 ($C_{3-20}$), 3 to 15 ($C_{3-15}$), 3 to 10 ($C_{3-10}$), or 3 to 6 ($C_{3-6}$) carbon atoms. Examples of alkenylene groups include, but are not limited to, ethenylene, allylene, propenylene, and butenylene.

The term "alkynyl" refers to a linear or branched monovalent hydrocarbon radical, which contains one or more, in one embodiment, one, two, three, four, or five, in another embodiment, one, carbon-carbon triple bond(s). In certain embodiments, the alkynyl is optionally substituted, in one embodiment, with one or more substituents Q. The term "alkynyl" also encompasses both linear and branched alkynyl, unless otherwise specified. In certain embodiments, the alkynyl is a linear monovalent hydrocarbon radical of 2 to 20 ($C_{2-20}$), 2 to 15 ($C_{2-15}$), 2 to 10 ($C_{2-10}$), 2 to 6 ($C_{2-6}$), or 2 to 3 ($C_{2-3}$) carbon atoms, or a branched monovalent hydrocarbon radical of 3 to 20 ($C_{3-20}$), 3 to 15 ($C_{3-15}$), 3 to 10 ($C_{3-10}$), or 3 to 6 ($C_{3-6}$) carbon atoms. Examples of alkynyl groups include, but are not limited to, ethynyl (—C≡CH) and propargyl (—CH$_2$C≡CH). For example, $C_{2-6}$ alkynyl refers to a linear unsaturated monovalent hydrocarbon radical of 2 to 6 carbon atoms or a branched unsaturated monovalent hydrocarbon radical of 3 to 6 carbon atoms.

The term "cycloalkyl" refers to a cyclic saturated and/or non-aromatic unsaturated, bridged and/or non-bridged monovalent hydrocarbon radical. In certain embodiments, the cycloalkyl is optionally substituted, in one embodiment, with one or more substituents Q. In certain embodiments, the cycloalkyl has from 3 to 20 ($C_{3-20}$), from 3 to 15 ($C_{3-15}$), from 3 to 10 ($C_{3-10}$), or from 3 to 7 ($C_{3-7}$) carbon atoms. Examples of cycloalkyl groups include, but are not limited to, cyclopropyl, cyclobutyl, cyclobutenyl, cyclopentyl, cyclopentenyl, cyclohexyl, cyclohexenyl, cycloheptyl, cycloheptenyl, bicyclo[2.1.1]hexyl, bicyclo[2.2.1]heptyl, decalinyl, and adamantyl.

The term "cycloalkylene" refers to a cyclic divalent hydrocarbon radical, which is optionally substituted with one or more substituents Q as described herein. In one embodiment, the cycloalkylene is saturated or unsaturated but non-aromatic, and/or bridged, and/or non-bridged, and/or fused bicyclic groups. In certain embodiments, the cycloalkylene has from 3 to 20 ($C_{3-20}$), from 3 to 15 ($C_{3-15}$), from 3 to 10 ($C_{3-10}$), or from 3 to 7 ($C_{3-7}$) carbon atoms. Examples of cycloalkylene groups include, but are not limited to, cyclopropylene (e.g., 1,1-cyclopropylene and 1,2-cyclopropylene), cyclobutylene (e.g., 1,1-cyclobutylene, 1,2-cyclobutylene, or 1,3-cyclobutylene), cyclopentylene (e.g., 1,1-cyclopentylene, 1,2-cyclopentylene, or 1,3-cyclopentylene), cyclohexylene (e.g., 1,1-cyclohexylene, 1,2-cyclohexylene, 1,3-cyclohexylene, or 1,4-cyclohexylene), cycloheptylene (e.g., 1,1-cycloheptylene, 1,2-cycloheptylene, 1,3-cycloheptylene, or 1,4-cycloheptylene), decalinylene, and adamantylene.

The term "aryl" refers to a monocyclic aromatic group and/or multicyclic monovalent aromatic group that contain at least one aromatic hydrocarbon ring. In certain embodiments, the aryl has from 6 to 20 ($C_{6-20}$), from 6 to 15 ($C_{6-15}$), or from 6 to 10 ($C_{6-10}$) ring atoms. Examples of aryl groups include, but are not limited to, phenyl, naphthyl, fluorenyl, azulenyl, anthryl, phenanthryl, pyrenyl, biphenyl, and terphenyl. The term "aryl" also refers to bicyclic or tricyclic carbon rings, where one of the rings is aromatic and the others of which may be saturated, partially unsaturated, or aromatic, for example, dihydronaphthyl, indenyl, indanyl, or tetrahydronaphthyl (tetralinyl). In certain embodiments, the aryl is optionally substituted, in one embodiment, with one or more substituents Q.

The term "arylene" refers to a monocyclic aromatic group and/or multicyclic divalent aromatic group that contain at least one aromatic hydrocarbon ring. In certain embodiments, the arylene has from 6 to 20 ($C_{6-20}$), from 6 to 15 ($C_{6-15}$), or from 6 to 10 ($C_{6-10}$) ring atoms. Examples of arylene groups include, but are not limited to, phenylene, naphthylene, fluorenylene, azulenylene, anthrylene, phenanthrylene, pyrenylene, biphenylene, and terphenylene. The term "arylene" also refers to bicyclic or tricyclic carbon rings, where one of the rings is aromatic and the others of which may be saturated, partially unsaturated, or aromatic, for example, dihydronaphthylene, indenylene, indanylene, or tetrahydronaphthylene (tetralinylene). In certain embodiments, the arylene is optionally substituted, in one embodiment, with one or more substituents Q.

The term "aralkyl" or "arylalkyl" refers to a monovalent alkyl group substituted with one or more aryl groups. In certain embodiments, the aralkyl has from 7 to 30 ($C_{7-30}$), from 7 to 20 ($C_{7-20}$), or from 7 to 16 ($C_{7-16}$) carbon atoms. Examples of aralkyl groups include, but are not limited to, benzyl, 2-phenylethyl, and 3-phenylpropyl. In certain embodiments, the aralkyl is optionally substituted, in one embodiment, with one or more substituents Q.

The term "heteroaryl" refers to a monovalent monocyclic aromatic group and/or monovalent polycyclic aromatic group that contain at least one aromatic ring, wherein at least one aromatic ring contains one or more heteroatoms independently selected from O, S, N, and P in the ring. A heteroaryl group is bonded to the rest of a molecule through its aromatic ring. Each ring of a heteroaryl group can contain one or two O atoms, one or two S atoms, one to four N atoms, and/or one or two P atoms, provided that the total number of heteroatoms in each ring is four or less and each ring contains at least one carbon atom. In certain embodiments, the heteroaryl has from 5 to 20, from 5 to 15, or from 5 to 10 ring atoms. Examples of monocyclic heteroaryl groups include, but are not limited to, furanyl, imidazolyl, isothiazolyl, isoxazolyl, oxadiazolyl, oxadiazolyl, oxazolyl, pyrazinyl, pyrazolyl, pyridazinyl, pyridyl, pyrimidinyl, pyrrolyl, thiadiazolyl, thiazolyl, thienyl, tetrazolyl, triazinyl, and triazolyl. Examples of bicyclic heteroaryl groups include, but are not limited to, benzofuranyl, benzimidazolyl, benzoisoxazolyl, benzopyranyl, benzothiadiazolyl, benzothiazolyl, benzothienyl, benzotriazolyl, benzoxazolyl, furopyridyl, imidazopyridinyl, imidazothiazolyl, indolizinyl, indolyl, indazolyl, isobenzofuranyl, isobenzothienyl, isoindolyl, isoquinolinyl, isothiazolyl, naphthyridinyl, oxazolopyridinyl, phthalazinyl, pteridinyl, purinyl, pyridopyridyl, pyrrolopyridyl, quinolinyl, quinoxalinyl, quinazolinyl, thiadiazolopyrimidyl, and thienopyridyl. Examples of tricyclic heteroaryl groups include, but are not limited to, acridinyl, benzindolyl, carbazolyl, dibenzofuranyl, perimidinyl, phenanthrolinyl, phenanthridinyl, phenarsazinyl, phenazinyl, phenothiazinyl, phenoxazinyl, and xanthenyl. In certain embodiments, the heteroaryl is optionally substituted, in one embodiment, with one or more substituents Q.

The term "heteroarylene" refers to a divalent monocyclic aromatic group and/or divalent polycyclic aromatic group that contain at least one aromatic ring, wherein at least one aromatic ring contains one or more heteroatoms independently selected from O, S, N, and P in the ring. A heteroarylene group is bonded to the rest of a molecule through its aromatic ring via at least one of the two valencies. Each ring of a heteroarylene group can contain one or two O atoms, one or two S atoms, one to four N atoms, and/or one or two P atoms, provided that the total number of heteroatoms in each ring is four or less and each ring contains at least one carbon atom. In certain embodiments, the heteroarylene has from 5 to 20, from 5 to 15, or from 5 to 10 ring atoms. Examples of monocyclic heteroarylene groups include, but are not limited to, furanylene, imidazolylene, isothiazolylene, isoxazolylene, oxadiazolylene, oxadiazolylene, oxazolylene, pyrazinylene, pyrazolylene, pyridazinylene, pyridylene, pyrimidinylene, pyrrolylene, thiadiazolylene, thiazolylene, thienylene, tetrazolylene, triazinylene, and triazolylene. Examples of bicyclic heteroarylene groups include, but are not limited to, benzofuranylene, benzimidazolylene, benzoisoxazolylene, benzopyranylene, benzothiadiazolylene, benzothiazolylene, benzothienylene, benzotriazolylene, benzoxazolylene, furopyridylene, imidazopyridinylene, imidazothiazolylene, indolizinylene, indolylene, indazolylene, isobenzofuranylene, isobenzothienylene, isoindolylene, isoquinolinylene, isothiazolylene, naphthyridinylene, oxazolopyridinylene, phthalazinylene, pteridinylene, purinylene, pyridopyridylene, pyrrolopyridylene, quinolinylene, quinoxalinylene, quinazolinylene, thiadiazolopyrimidylene, and thienopyridylene. Examples of tricyclic heteroarylene groups include, but are not limited to, acridinylene, benzindolylene, carbazolylene, dibenzofuranylene, perimidinylene, phenanthrolinylene, phenanthridinylene, phenarsazinylene, phenazinylene, phenothiazinylene, phenoxazinylene, and xanthenylene. In certain embodiments, the heteroarylene is optionally substituted, in one embodiment, with one or more substituents Q.

The term "heterocyclyl" or "heterocyclic" refers to a monovalent monocyclic non-aromatic ring system and/or monovalent polycyclic ring system that contain at least one non-aromatic ring, wherein one or more of the non-aromatic ring atoms are heteroatoms independently selected from O, S, N, and P; and the remaining ring atoms are carbon atoms. In certain embodiments, the heterocyclyl or heterocyclic group has from 3 to 20, from 3 to 15, from 3 to 10, from 3 to 8, from 4 to 7, or from 5 to 6 ring atoms. A heterocyclyl group is bonded to the rest of a molecule through its non-aromatic ring. In certain embodiments, the heterocyclyl is a monocyclic, bicyclic, tricyclic, or tetracyclic ring system, which may be spiro, fused, or bridged, and in which nitrogen or sulfur atoms may be optionally oxidized, nitrogen atoms may be optionally quaternized, and some rings may be partially or fully saturated, or aromatic. Examples of heterocyclic groups include, but are not limited to, azepinyl, benzodioxanyl, benzodioxolyl, benzofuranonyl, benzopyranonyl, benzopyranyl, benzotetrahydrofuranyl, benzotetrahydrothienyl, benzothiopyranyl, benzoxazinyl, β-carbolinyl, chromanyl, chromonyl, cinnolinyl, coumarinyl, decahydroisoquinolinyl, dihydrobenzisothiazinyl, dihydrobenzisoxazinyl, dihydrofuryl, dihydroisoindolyl, dihydropyranyl, dihydropyrazolyl, dihydropyrazinyl, dihydropyridinyl, dihydropyrimidinyl, dihydropyrrolyl, dioxolanyl, 1,4-dithianyl, furanonyl, imidazolidinyl, imidazolinyl, indolinyl, isobenzotetrahydrofuranyl, isobenzotetrahydrothienyl, isochromanyl, isocoumarinyl, isoindolinyl, isothiazolidinyl, isoxazolidinyl, morpholinyl, octahydroindolyl, octahydroisoindolyl, oxazolidinonyl, oxazolidinyl, oxiranyl, piperazinyl, piperidinyl, 4-piperidonyl, pyrazolidinyl, pyrazolinyl, pyrrolidinyl, pyrrolinyl, quinuclidinyl, tetrahydrofuryl, tetrahydroisoquinolinyl, tetrahydropyranyl, tetrahydrothienyl, thiamorpholinyl, thiazolidinyl, tetrahydroquinolinyl, and 1,3,5-trithianyl. In certain embodiments, the heterocyclyl is optionally substituted, in one embodiment, with one or more substituents Q.

The term "heterocyclylene" refers to a divalent monocyclic non-aromatic ring system or divalent polycyclic ring system that contains at least one non-aromatic ring, wherein one or more of the non-aromatic ring atoms are heteroatoms independently selected from O, S, and N; and the remaining ring atoms are carbon atoms. The heterocyclylene is bonded to the rest of a molecule through the non-aromatic ring. In certain embodiments, the heterocyclylene has from 3 to 20, from 3 to 15, from 3 to 10, from 3 to 8, from 4 to 7, or from 5 to 6 ring atoms. In certain embodiments, the heterocyclylene is a monocyclic, bicyclic, tricyclic, or tetracyclic ring system, which may be fused or bridged, and in which nitrogen or sulfur atoms may be optionally oxidized, nitrogen atoms may be optionally quaternized, and some rings may be partially or fully saturated, or aromatic. The heterocyclylene may be attached to the main structure at any heteroatom or carbon atom which results in the creation of a stable compound. Examples of such heterocyclylene groups include, but are not limited to, azepinylene, benzodioxanylene, benzodioxolylene, benzofuranonylene, benzopyranonylene, benzopyranylene, benzotetrahydrofuranylene, benzotetrahydrothienylene, benzothiopyranylene, benzoxazinylene, β-carbolinylene, chromanylene, chromonylene, cinnolinylene, coumarinylene, decahydroisoquinolinylene, dihydrobenzisothiazinylene, dihydrobenzisoxazinylene, dihydrofurylene, dihydroisoindolylene, dihydropyranylene, dihydropyrazolylene, dihydropyrazinylene, dihydropyridinylene, dihydropyrimidinylene, dihydropyrrolylene, dioxolanylene, 1,4-dithianylene, furanonylene, imidazolidinylene, imidazolinylene, indolinylene, isobenzotetrahydrofuranylene, isobenzotetrahydrothienylene, isochromanylene, isocoumarinylene, isoindolinylene, isothiazolidinylene, isoxazolidinylene, morpholinylene, octahydroindolylene, octahydroisoindolylene, oxazolidinonylene, oxazolidinylene, oxiranylene, piperazinylene, piperidinylene, 4-piperidonylene, pyrazolidinylene, pyrazolinylene, pyrrolidinylene, pyrrolinylene, quinuclidinylene, tetrahydrofurylene, tetrahydroisoquinolinylene, tetrahydropyranylene, tetrahydrothienylene, thiamorpholinylene, thiazolidinylene, tetrahydroquinolinylene, and 1,3,5-trithianylene. In certain embodiments, the heterocyclylene is optionally substituted with one or more substituents Q as described herein.

The term "halogen," "halide," or "halo" refers to fluorine, chlorine, bromine, and/or iodine.

The term "alkoxy" refers to —O-alkyl, —O-alkenyl, —O-alkynyl, —O-cycloalkyl, —O-aryl, —O-heteroaryl, and/or —O-heterocyclyl, wherein the alkyl, alkenyl, alkynyl, cycloalkyl, aryl, heteroaryl, and heterocyclyl are each independently optionally substituted, in one embodiment, with one or more substituents Q. In certain embodiments, the term "alkoxy" refers to —O-alkyl, —O-alkenyl, and/or —O-alkynyl, each optionally substituted, in one embodiment, with one or more substituents Q. In certain embodiments, the term "alkoxy" refers to —O-alkyl, optionally substituted, in one embodiment, with one or more substituents Q.

The term "aryleneoxy" refers to a divalent —O-arylene, wherein the arylene is optionally substituted, in one embodiment, with one or more substituents Q.

The term "amino" refers to —$NR^yR^z$, wherein $R^y$ and $R^z$ are each independently hydrogen, alkyl, alkenyl, alkynyl, cycloalkyl, aryl, heteroaryl, or heterocyclyl, wherein the alkyl, alkenyl, alkynyl, cycloalkyl, aryl, heteroaryl, and heterocyclyl are each independently optionally substituted, in one embodiment, with one or more substituents Q. In one embodiment, the amino is —$NH_2$.

The term "amido" refers to —$NC(O)R^y$, wherein $R^y$ is independently hydrogen, alkyl, alkenyl, alkynyl, cycloalkyl, aryl, heteroaryl, or heterocyclyl, wherein the alkyl, alkenyl, alkynyl, cycloalkyl, aryl, heteroaryl, and heterocyclyl are each independently optionally substituted, in one embodiment, with one or more substituents Q. In one embodiment, the amido is acylamino. In another embodiment, the amido is acetylamino.

The term "imido" refers to —$N(C(O)R^y)(C(O)R^z)$, wherein $R^y$ and $R^z$ are each independently hydrogen, alkyl, alkenyl, alkynyl, cycloalkyl, aryl, heteroaryl, or heterocyclyl; or $R^y$ and $R^z$ are linked together to form heterocyclyl; wherein the alkyl, alkenyl, alkynyl, cycloalkyl, aryl, heteroaryl, and heterocyclyl are each independently optionally substituted, in one embodiment, with one or more substituents Q. In one embodiment, the imido is phthalimido.

The term "optionally substituted" is intended to mean that a group or substituent, such as an alkyl, alkenyl, alkynyl, cycloalkyl, aryl, arylene, aralkyl, heteroaryl, heteroarylene, and heterocyclyl group, may be substituted with one or more substituents Q, where each substituent Q is independently selected from, e.g., (a) oxo (=O), halo, cyano (—CN), and nitro (—$NO_2$); (b) $C_{1-6}$ alkyl, $C_{2-6}$ alkenyl, $C_{2-6}$ alkynyl, $C_{3-10}$ cycloalkyl, $C_{6-14}$ aryl, $C_{7-15}$ aralkyl, heteroaryl, and heterocyclyl, each of which is further optionally substituted with one or more, in one embodiment, one, two, three, four, or five, substituents $Q^a$; and (c) —$C(O)R^{1a}$, —$C(O)OR^{1a}$, —$C(O)NR^{1b}R^{1c}$, —$C(NR^{1a})NR^{1b}R^{1c}$, —$OR^{1a}$, —$OC(O)R^{1a}$, —$OC(O)OR^{1a}$, —$OC(O)NR^{1b}R^{1c}$, —$OC(=NR^{1a})NR^{1b}R^{1c}$, —$OS(O)R^{1a}$, —$OS(O)_2R^{1a}$, —$OS(O)NR^{1b}R^{1c}$, —$OS(O)_2NR^{1b}R^{1c}$, —$NR^{1b}R^{1c}$, —$NR^{1a}C(O)R^{1d}$, —$NR^{1a}C(O)OR^{1d}$, —$NR^{1a}C(O)NR^{1b}R^{1c}$, —$NR^{1a}C(=NR^{1d})NR^{1b}R^{1c}$, —$NR^{1a}S(O)R^{1d}$, —$NR^{1a}S(O)_2R^{1d}$, —$NR^{1a}S(O)NR^{1b}R^{1c}$, —$NR^{1a}S(O)_2NR^{1b}R^{1c}$, —$P(O)R^{1a}R^{1d}$, —$P(O)(OR^{1a})R^{1d}$, —$P(O)(OR^{1a})(OR^{1d})$, —$SR^{1a}$, —$S(O)R^{1a}$, —$S(O)_2R^{1a}$, —$S(O)NR^{1b}R^{1c}$ and —$S(O)_2NR^{1b}R^{1c}$, wherein each $R^{1a}$, $R^{1b}$, $R^{1c}$, and $R^{1d}$ is independently (i) hydrogen; (ii) $C_{1-6}$ alkyl, $C_{2-6}$ alkenyl, $C_{2-6}$ alkynyl, $C_{3-10}$ cycloalkyl, $C_{6-14}$ aryl, $C_{7-15}$ aralkyl, heteroaryl, or heterocyclyl, each of which is optionally substituted with one or more, in one embodiment, one, two, three, or four, substituents $Q^a$; or (iii) $R^{1b}$ and $R^{1c}$ together with the N atom to which they are attached form heteroaryl or heterocyclyl, optionally substituted with one or more, in one embodiment, one, two, three, or four, substituents $Q^a$. As used herein, all groups that can be substituted are "optionally substituted," unless otherwise specified.

In one embodiment, each substituent $Q^a$ is independently selected from the group consisting of (a) oxo, cyano, halo, and nitro; and (b) $C_{1-6}$ alkyl, $C_{2-6}$ alkenyl, $C_{2-6}$ alkynyl, $C_{3-10}$ cycloalkyl, $C_{6-14}$ aryl, $C_{7-15}$ aralkyl, heteroaryl, and heterocyclyl; and (c) —$C(O)R^{1e}$, —$C(O)OR^{1e}$, —$C(O)NR^{1f}R^{1g}$, —$C(NR^{1e})NR^{1f}R^{1g}$, —$OR^{1e}$, —$OC(O)R^{1e}$, —$OC(O)OR^{1e}$, —$OC(O)NR^{1f}R^{1g}$, —$OC(=NR^{1e})NR^{1f}R^{1g}$, —$OS(O)R^{1e}$, —$OS(O)_2R^{1e}$, —$OS(O)NR^{1f}R^{1g}$, —$OS(O)_2NR^{1f}R^{1g}$, —$NR^{1f}R^{1g}$, —$NR^{1e}C(O)R^{1h}$, —$NR^{1e}C(O)OR^{1h}$, —$NR^{1e}C(O)NR^{1f}R^{1g}$, —$NR^{1e}C(=NR^{1h})NR^{1f}R^{1g}$, —$NR^{1e}S(O)R^{1h}$, —$NR^{1e}S(O)_2R^{1h}$, —$NR^{1e}S(O)NR^{1f}R^{1g}$, —$NR^{1e}S(O)_2NR^{1f}R^{1g}$, —$P(O)R^{1e}R^{1h}$, —$P(O)(OR^{1e})R^{1h}$, —$P(O)(OR^{1e})(OR^{1h})$, —$SR^{1e}$, —$S(O)R^{1e}$, —$S(O)_2R^{1e}$, —$S(O)NR^{1f}R^{1g}$, and —$S(O)_2NR^{1f}R^{1g}$; wherein each $R^{1e}$, $R^{1f}$, $R^{1g}$, and $R^{1h}$ is independently (i) hydrogen, $C_{1-6}$ alkyl, $C_{2-6}$ alkenyl, $C_{2-6}$ alkynyl, $C_{3-10}$ cycloalkyl, $C_{6-14}$ aryl, $C_{7-15}$ aralkyl, heteroaryl, or heterocyclyl; or (ii) $R^{1f}$ and $R^{1g}$ together with the N atom to which they are attached form heteroaryl or heterocyclyl.

The terms "adding," "reacting," and "mixing" are used interchangeably to refer to contacting one reactant, reagent, solvent, catalyst, or a reactive group with another reactant, reagent, solvent, catalyst, or reactive group. Unless otherwise specified, reactants, reagents, solvents, catalysts, and reactive groups can be added individually, simultaneously, or separately, and/or can be added in any order unless specified specifically. They can be added in the presence or absence of heat, and can optionally be added under an inert atmosphere (e.g., $N_2$ or Ar). In certain embodiments, the term "reacting" can also refer to in situ formation or intramolecular reaction where the reactive groups are in the same molecule.

The term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 1 or 2 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range. In certain embodiments, the term "about" or "approximately" means within 10%, 9%, 8%, 7%, 6%, 5%, 4%, 3%, 2%, 1%, 0.5%, or 0.05% of a given value or range.

The term "substantially complete" when referring to a reaction means that the reaction contains no greater than about 50%, no greater than about 40%, no greater than about 30%, no greater than about 20%, no greater than about 10%, no greater than about 5%, no greater than about 4%, no greater than about 3%, no greater than about 2%, no greater than about 1%, no greater than about 0.5%, no greater than about 0.1%, or no greater than about 0.05% of a starting material.

The term "initiator" refers to a compound capable of providing two or more carbocations to which a monomer (e.g., olefin or isobutylene) may add during a carbocationic polymerization.

The term "initiator residue" refers to a polyvalent, in one embodiment, divalent, moiety that is bonded to two or more polymer groups. In certain embodiments, the initiator residue is derived from an initiator. In certain embodiments, the initiator residue is the portion of an initiator that remains after forming two or more carbocations and reacting with a monomer during a polymerization.

The term "monomer" refers to a compound that is capable of forming one of the two or more repetitive units of a polymer. In certain embodiments, the monomer is an olefin. In certain embodiments, the monomer is isobutene.

The term "comonomer" refers to a monomer that is capable of forming a copolymer with another monomer. Accordingly, a copolymer comprises two or more comonomers.

The term "telechelic polymer" refers to a polymer having two or more end groups, wherein the end groups are capable of reacting with another molecule.

The term "polyolefin" refers to a polymer that comprises two or more monomeric olefin units. In certain embodiments, the polyolefin is polyethylene, polypropylene, polyisobutylene, or polystyrene. In certain embodiments, the polyolefin comprises an initiator residue.

The term "polyisobutylene" or "PIB" refers to a polymer comprising two or more monomeric isobutylene units. In certain embodiments, the polyisobutylene comprises an initiator residue.

The term "divalent polyisobutylene group" refers to a divalent residue of a polyisobutylene, which, in certain embodiments, comprises an initiator residue.

The term "divalent oligoolefin group" refers to a divalent residue of a polymer consisting of two or more monomeric olefin units.

The term "divalent oligoisobutylene group" refers to a divalent residue of a polymer consisting of two or more monomeric isobutylene units.

The term "polyamine" refers to a compound that has two or more, in one embodiment, two, amino groups. In certain embodiments, the polyamine is a polyaminopolymer. In certain embodiments, the polyamine is a polyaminopolyolefin. In certain embodiments, the polyamine is a polyaminopolyisobutylene. In certain embodiments, the polyamine is a polyetheramine. In certain embodiments, the polyamine has the structure of $R^A(NH_2)_q$, wherein $R^A$ is alkyl, cycloalkyl, aryl, heteroaryl, or heterocyclyl; and q is an integer of 2, 3, or 4. In certain embodiments, the polyamine has the structure of $H_2N—R^A—NH_2$, wherein $R^A$ is alkylene, cycloalkylene, arylene, heteroarylene, or heterocyclylene. In certain embodiments, the polyamine is $H_2N—C_{2-12}$ alkylene-$NH_2$. In certain embodiments, the polyamine is ethylene diamine. In certain embodiments, the polyamine is $H_2N$-cycloalkylene-$NH_2$. In certain embodiments, the polyamine is diaminocyclohexane. In certain embodiments, the polyamine is 1,4-diaminocyclohexane. In certain embodiments, the polyamine is $H_2N$-aryl-$NH_2$. In certain embodiments, the polyamine is phenylene diamine. In certain embodiments, the polyamine is 1,4-phenylenediamine.

The term "polyaminopolymer" refers to a polymer that has two or more, in one embodiment, two, amino groups. In certain embodiments, the polyaminopolymer has two or more, in one embodiment, two, terminal amino groups. In certain embodiments, the polyaminopolymer has two or more, in one embodiment, two, terminal primary amino groups. In certain embodiments, the polyaminopolymer is a telechelic polymer.

The term "polyaminopolyolefin" refers to a polyolefin that has two or more, in one embodiment, two, amino groups. In certain embodiments, the polyaminopolyolefin has two or more, in one embodiment, two, terminal amino groups. In certain embodiments, the polyaminopolyolefin has two or more, in one embodiment, two, terminal primary amino groups. In certain embodiments, the polyaminopolyolefin is a telechelic polymer. In certain embodiments, the polyaminopolyolefin is a quasi-living polymer. In certain embodiments, the polyaminopolyolefin is a quasi-living telechelic polymer.

The term "polyaminopolyisobutylene" or "polyamino-PIB" refers to a polyisobutylene (PIB) that has two or more, in one embodiment, two, amino groups. In certain embodiments, the polyaminopolyisobutylene has two or more, in one embodiment, two, terminal amino groups. In certain embodiments, the polyaminopolyisobutylene has two or more, in one embodiment, two, terminal primary amino groups. In certain embodiments, the polyaminopolyisobutylene is a telechelic polymer. In certain embodiments, the polyaminopolyisobutylene is a quasi-living polymer. In certain embodiments, the polyaminopolyisobutylene is a quasi-living telechelic polymer.

The term "polyetheramine" or "polyaminopolyether" refers to a poly(alkylene oxide) that has two or more, in one embodiment, two, amino groups. In certain embodiments, the polyetheramine has two or more, in one embodiment, two, terminal amino groups. In certain embodiments, the polyetheramine has two or more, in one embodiment, two, terminal primary amino groups. In certain embodiments, the polyetheramine is a telechelic polymer.

The term "polyaminopoly(propylene oxide)" or "polyaminopoly(propylene glycol)" refers to a poly(propylene oxide) that has two or more, in one embodiment, two, amino groups. In certain embodiments, the polyaminopoly(propylene oxide) has two or more, in one embodiment, two, terminal amino groups. In certain embodiments, the polyaminopoly(propylene oxide) has two or more, in one embodiment, two, terminal primary amino groups. In certain embodiments, the polyaminopoly(propylene oxide) is a telechelic polymer.

The term "polyanhydride" refers to a compound that has two or more, in one embodiment, two, anhydride (—C(O)—O—C(O)—) groups. Accordingly, the term "dianhydride" refers to a compound that has two anhydride groups.

The term "diamine" refers to a compound that has two amino groups. In certain embodiments, the diamine is a diaminopolymer. In certain embodiments, the diamine is a diaminopolyolefin. In certain embodiments, the diamine is a diaminopolyisobutylene. In certain embodiments, the diamine is a polyetherdiamine. In certain embodiments, the diamine has the structure of $H_2N—R^A—NH_2$, wherein $R^A$ is alkylene, cycloalkylene, arylene, heteroarylene, or heterocyclylene. In certain embodiments, the diamine is $H_2N—C_{2-12}$ alkylene-$NH_2$. In certain embodiments, the diamine is ethylene diamine. In certain embodiments, the diamine is $H_2N$-cycloalkylene-$NH_2$. In certain embodiments, the diamine is diaminocyclohexane. In certain embodiments, the diamine is 1,4-diaminocyclohexane. In certain embodiments, the diamine is $H_2N$-aryl-$NH_2$. In certain embodiments, the diamine is phenylene diamine. In certain embodiments, the diamine is 1,4-phenylenediamine.

The term "diaminopolymer" refers to a polymer that has two amino groups. In certain embodiments, the diaminopolymer has two terminal amino groups. In certain embodiments, the diaminopolymer has two terminal primary amino groups. In certain embodiments, the diaminopolymer is a telechelic polymer.

The term "diaminopolyolefin" refers to a polyolefin that has two amino groups. In certain embodiments, the diaminopolyolefin has two terminal amino groups. In certain embodiments, the diaminopolyolefin has two terminal primary amino groups. In certain embodiments, the diaminopolyolefin is a telechelic polymer. In certain embodiments, the diaminopolyolefin is a quasi-living polymer. In certain embodiments, the diaminopolyolefin is a quasi-living telechelic polymer.

The term "diaminopolyisobutylene" or "diamino-PIB" refers to a polyisobutylene (PIB) that has two amino groups. In certain embodiments, the diaminopolyisobutylene has two terminal amino groups. In certain embodiments, the diaminopolyisobutylene has two terminal primary amino groups. In certain embodiments, the diaminopolyisobutylene is a telechelic polymer. In certain embodiments, the diaminopolyisobutylene is a quasi-living polymer. In certain embodiments, the diaminopolyisobutylene is a quasi-living telechelic polymer.

The term "polyetherdiamine" or "diaminopolyether" refers to a poly(alkylene oxide) that has two amino groups. In certain embodiments, the polyetherdiamine has two terminal amino groups. In certain embodiments, the polyetherdiamine has two terminal primary amino groups. In certain embodiments, the polyetherdiamine is a telechelic polymer.

The term "diaminopoly(propylene oxide)" or "diaminopoly(propylene glycol)" refers to a poly(propylene oxide) that has two amino groups. In certain embodiments, the diaminopoly(propylene oxide) has two terminal amino groups. In certain embodiments, the diaminopoly(propylene oxide) has two terminal primary amino groups. In certain embodiments, the diaminopoly(propylene oxide) is a telechelic polymer.

The term "quasi-living polyolefin" refers to a polyolefin that is formed under a quasi-living polymerization condition, under which the polymerization proceeds in the absence of a measurable irreversible chain-breaking event.

The term "polydispersity index" or "PDI" refers to the ratio of the weight average molecular weight of a polymer to the number average molecular weight of the polymer.

4.2 Copolymers of Polyoamines and Polyanhydrides

In one embodiment, provided herein is a copolymer of a polyamine that has two or more amino groups and a polyanhydride that has two or more anhydride groups; wherein the polyamine comprises a polyaminopolyolefin, in one embodiment, a quasi-living polyaminopolyolefin, that has two or more amino groups. Thus, in an embodiment, provided herein is a copolymer of a polyamine and a polyanhydride; wherein the polyamine comprises a quasi-living polyaminopolyolefin.

In another embodiment, provided herein is a copolymer of a polyaminopolymer that has two or more terminal amino groups and a polyanhydride that has two or more anhydride groups; wherein the polyaminopolymer comprises a polyaminopolyolefin, in one embodiment, a quasi-living polyaminopolyolefin, that has two or more terminal amino groups. Thus, in an embodiment, provided herein is a copolymer of a polyaminopolymer and a polyanhydride; wherein the polyaminopolymer comprises a quasi-living polyaminopolyolefin.

In yet another embodiment, provided herein is a copolymer of a polyaminopolyolefin, in one embodiment, a quasi-living polyaminopolyolefin, that has two or more terminal amino groups, and a polyanhydride that has two or more anhydride groups. Thus, in an embodiment, provided herein is a copolymer of a quasi-living polyaminopolyolefin and a polyanhydride.

In yet another embodiment, provided herein is a copolymer of a polyaminopolymer that has two or more terminal amino groups, and a polyanhydride that has two or more anhydride groups; wherein the polyaminopolymer comprises a polyaminopolyolefin, in one embodiment, a quasi-living polyaminopolyolefin, that has two or more terminal amino groups, and a polyetheramine that has two or more terminal amino groups. Thus, in an embodiment, provided herein is a copolymer of a polyaminopolymer and a polyanhydride; wherein the polyaminopolymer comprises a quasi-living polyaminopolyolefin and a polyetheramine.

In still another embodiment, provided herein is a copolymer of a polyaminopolyolefin, in one embodiment, a quasi-living polyaminopolyolefin, that has two or more terminal amino groups, a polyetheramine that has two or more terminal amino groups, and a polyanhydride that has two or more anhydride groups. Thus, in an embodiment, provided herein is a copolymer of a quasi-living polyaminopolyolefin, a polyetheramine, and a polyanhydride.

In one embodiment, provided herein is a copolymer of a polyamine that has two or more terminal amino groups and a polyanhydride that has two or more anhydride groups; wherein the polyamine comprises a polyamino-PIB, in one embodiment, a quasi-living polyamino-PIB, that has two or more terminal amino groups. Thus, in an embodiment, provided herein is a copolymer of a polyamine and a polyanhydride; wherein the polyamine comprises a quasi-living polyamino-PIB.

In another embodiment, provided herein is a copolymer of a polyaminopolymer that has two or more terminal amino groups and a polyanhydride that has two or more anhydride groups; wherein the polyaminopolymer comprises a polyamino-PIB, in one embodiment, a quasi-living polyamino-PIB, that has two or more terminal amino groups. Thus, in an embodiment, provided herein is a copolymer of a polyaminopolymer and a polyanhydride; wherein the polyaminopolymer comprises a quasi-living polyamino-PIB.

In yet another embodiment, provided herein is a copolymer of a polyamino-PIB, in one embodiment, a quasi-living polyamino-PIB, that has two or more terminal amino groups, and a polyanhydride that has two or more anhydride groups. Thus, in an embodiment, provided herein is a copolymer of a quasi-living polyamino-PIB and a polyanhydride.

In yet another embodiment, provided herein is a copolymer of a polyaminopolymer that has two or more terminal amino groups and a polyanhydride that has two or more anhydride groups; wherein the polyaminopolymer comprises a polyamino-PIB, in one embodiment, a quasi-living polyamino-PIB, that has two or more terminal amino groups, and a polyaminopoly(propylene oxide) that has two or more terminal amino groups. Thus, in an embodiment, provided herein is a copolymer of a polyaminopolymer and a polyanhydride; wherein the polyaminopolymer comprises a quasi-living polyamino-PIB and a polyaminopoly(propylene oxide).

In still another embodiment, provided herein is a copolymer of a polyamino-PIB, in one embodiment, a quasi-living polyamino-PIB, that has two or more terminal amino groups, a polyaminopoly(propylene oxide) that has two or more terminal amino groups, and a polyanhydride that has two or more anhydride groups. Thus, in an embodiment, provided herein is a copolymer of a quasi-living polyamino-PIB, a polyaminopoly(propylene oxide), and a polyanhydride.

In one embodiment, provided herein is a copolymer of a diamine and a dianhydride, wherein the diamine comprises a diaminopolyolefin, in one embodiment, a quasi-living diaminopolyolefin. Thus, in an embodiment, provided herein is a copolymer of a diamine and a dianhydride; wherein the diamine comprises a quasi-living diaminopolyolefin.

In another embodiment, provided herein is a copolymer of a diaminopolymer and a dianhydride, wherein the diaminopolymer comprises a diaminopolyolefin, in one embodiment, a quasi-living diaminopolyolefin. Thus, in an embodiment, provided herein is a copolymer of a diaminopolymer and a dianhydride; wherein the diaminopolymer comprises a quasi-living diaminopolyolefin.

In yet another embodiment, provided herein is a copolymer of a diaminopolyolefin, in one embodiment, a quasi-living diaminopolyolefin, and a dianhydride. Thus, in an embodiment, provided herein is a copolymer of a quasi-living diaminopolyolefin and a dianhydride.

In yet another embodiment, provided herein is a copolymer of a diaminopolymer, and a dianhydride; wherein the diaminopolymer comprises a diaminopolyolefin, in one embodiment, a quasi-living diaminopolyolefin, and a polyetherdiamine. Thus, in an embodiment, provided herein is a copolymer of a diaminopolymer and a dianhydride; wherein the diaminopolymer comprises a quasi-living diaminopolyolefin and a polyetherdiamine.

In still another embodiment, provided herein is a copolymer of a diaminopolyolefin, in one embodiment, a quasi-living diaminopolyolefin, a polyetherdiamine, and a dianhydride. Thus, in an embodiment, provided herein is a copolymer of a quasi-living diaminopolyolefin, a polyetherdiamine, and a dianhydride.

In one embodiment, provided herein is a copolymer of a diamine and a dianhydride; wherein the diamine comprises a diaminopolyisobutylene (diamino-PIB), in one embodiment, a quasi-living diamino-PIB. Thus, in an embodiment, provided herein is a copolymer of a diamine and a dianhydride; wherein the diamine comprises a quasi-living diamino-PIB.

In another embodiment, provided herein is a copolymer of a diaminopolymer and a dianhydride; wherein the diaminopolymer comprises a diaminopolyisobutylene (diamino-PIB), in one embodiment, a quasi-living diamino-PIB. Thus, in an embodiment, provided herein is a copolymer of a diaminopolymer and a dianhydride; wherein the diaminopolymer comprises a quasi-living diamino-PIB.

In yet another embodiment, provided herein is a copolymer of a diamino-PIB, in one embodiment, a quasi-living diamino PIB, and a dianhydride. Thus, in an embodiment, provided herein is a copolymer of a quasi-living diamino-PIB and a dianhydride.

In yet another embodiment, provided herein is a copolymer of a diaminopolymer and a dianhydride; wherein the diaminopolymer comprises a diamino-PIB, in one embodiment, a quasi-living diamino-PIB, and a diaminopoly(propylene oxide). Thus, in an embodiment, provided herein is a copolymer of a diamino polymer and a dianhydride; wherein the diamino polymer comprises a quasi-living diamino-PIB and a diaminopoly(propylene oxide).

In still another embodiment, provided herein is a copolymer of a diamino-PIB, in one embodiment, a quasi-living diamino-PIB, a diaminopoly(propylene oxide), and a dianhydride. Thus, in an embodiment, provided herein is a copolymer of a quasi-living diamino-PIB, a diaminopoly(propylene oxide), and a dianhydride.

In certain embodiments, the copolymer provided herein has two or more terminal amino groups. In certain embodiments, the copolymer provided herein has two, three, or four terminal amino groups. In certain embodiments, the copolymer provided herein has two terminal amino groups. In certain embodiments, the copolymer provided herein has three terminal amino groups. In certain embodiments, the copolymer provided herein has four terminal amino groups.

In certain embodiments, the terminal amino groups are each a primary amino group. In certain embodiments, the terminal amino groups are end-capped by reacting with an end-capping reagent. In certain embodiments, the terminal amino groups are end-capped with an acyl group, thus to form terminal amido groups. In certain embodiments, the terminal amino groups are end-capped with an acetyl group, thus to form terminal acetamido groups. In certain embodiments, the terminal amino groups are end-capped by reacting with an anhydride to form imido groups. In certain embodiments, the terminal amino groups are end-capped by reacting with phthalic anhydride to form phthalimido groups. In certain embodiments, the terminal amino groups are end-capped with an alkoxycarbonyl group, thus to form terminal alkoxycarboxamido groups.

In one embodiment, provided herein is a copolymer of Formula A:

(A)

wherein:
each X is independently alkylene, cycloalkylene, arylene, heteroarylene, heterocyclylene, or a divalent polymer group, provided that at least one of the X groups is a divalent polyolefin group;

each Y is independently a divalent moiety containing two groups, each of which is independently amido or imido;

$R^5$ and $R^6$ are each independently amino, amido, or imido; and n is an integer from about 1 to about 100.

In one embodiment, provided herein is a copolymer of Formula A, wherein each X is independently a divalent polymer group, provided that at least one of the X groups is a divalent polyolefin group.

In another embodiment, provided herein is a copolymer of Formula A, wherein each X is independently a divalent polyolefin or poly(alkylene oxide) group, provided that at least one of the X groups is a divalent polyolefin group; each Y is independently a divalent moiety containing two imido groups; $R^5$ and $R^6$ are each independently amino, amido, or imido; and n is an integer ranging from about 1 to about 20.

In yet another embodiment, provided herein is a copolymer of Formula A, wherein each X is independently a divalent polyisobutylene or polypropylene oxide) group, provided that at least one of the X groups is a divalent polyisobutylene group; each Y is independently a divalent moiety containing two imido groups; $R^5$ and $R^6$ are each independently amino, amido, or imido; and n is an integer of 1, 2, 3, 4, 5, 6, 7, 8, 9, or 10.

In certain embodiments, the copolymer provided herein has a weight average molecular weight ranging from about 1,000 to about 1,000,000, from about 2,000 to about 500,000, from about 2,000 to about 200,000, from about 2,000 to about 100,000, from about 5,000 to about 50,000. In certain embodiments, the copolymer provided herein has a weight average molecular weight from about 1,000 to about 1,000,000. In certain embodiments, the copolymer provided herein has a weight average molecular weight from about 2,000 to about 500,000. In certain embodiments, the copolymer provided herein has a weight average molecular weight from about 2,000 to about 200,000. In certain embodiments, the copolymer provided herein has a weight average molecular weight from about 2,000 to about 100,000. In certain embodiments, the copolymer provided herein has a weight average molecular weight from about 5,000 to about 50,000. In certain embodiments, the copolymer provided herein has a weight average molecular weight of about 5,000, about 10,000, about 15,000, about 20,000, about 25,000, about 30,000, about 35,000, about 40,000, about 45,000, or about 50,000.

In certain embodiments, the copolymer provided herein has a number average molecular weight ranging from about 1,000 to about 1,000,000, from about 2,000 to about 500,000, from about 2,000 to about 200,000, from about 2,000 to about 100,000, from about 5,000 to about 50,000. In certain embodiments, the copolymer provided herein has a number average molecular weight from about 1,000 to about 1,000,000. In certain embodiments, the copolymer provided herein has a number average molecular weight from about 2,000 to about 500,000. In certain embodiments, the copolymer provided herein has a number average molecular weight from about 2,000 to about 200,000. In certain embodiments, the copolymer provided herein has a number average molecular weight from about 2,000 to about 100,000. In certain embodiments, the copolymer provided herein has a number average molecular weight from about 5,000 to about 50,000. In certain embodiments, the copolymer provided herein has a number average molecular weight of about 5,000, about 10,000, about 15,000, about 20,000, about 25,000, about 30,000, about 35,000, about 40,000, about 45,000, or about 50,000.

In certain embodiments, the copolymer provided herein has a polydispersity index of no greater than about 10, no greater than about 5, no greater than about 2.5, no greater than about 2, no greater than about 1.5, no greater than about 1.2, or no greater than about 1.1. In certain embodiments, the copolymer provided herein has a polydispersity index of no greater than about 10. In certain embodiments, the copolymer provided herein has a polydispersity index of no greater than about 5. In certain embodiments, the copolymer provided herein has a polydispersity index of no greater than about 2.5. In certain embodiments, the copolymer provided herein has a polydispersity index of no greater than about 2. In certain embodiments, the copolymer provided herein has a polydispersity index of no greater than about 1.5. In certain embodiments, the copolymer provided herein has a polydispersity index of no greater than about 1.2. In certain embodiments, the copolymer provided herein has a polydispersity index of no greater than about 1.1.

a. Polyaminopolymers

In one embodiment, the polyaminopolymer contains two or more amino groups. In certain embodiments, the polyaminopolymer contains two, three, or four amino groups. In certain embodiments, the polyaminopolymer contains two amino groups. In certain embodiments, the polyaminopolymer contains three amino groups. In certain embodiments, the polyaminopolymer contains four amino groups.

In another embodiment, the polyaminopolymer contains two or more primary amino groups. In certain embodiments, the polyaminopolymer contains two, three, or four primary amino groups. In certain embodiments, the polyaminopolymer contains two primary amino groups. In certain embodiments, the polyaminopolymer contains three primary amino groups. In certain embodiments, the polyaminopolymer contains four primary amino groups.

In one embodiment, the polyaminopolymer comprises a polyaminopolyolefin. In another embodiment, the polyaminopolymer is a polyaminopolyolefin.

In one embodiment, the polyaminopolymer comprises a polyaminopolyolefin and a polyetheramine. In another embodiment, the polyamino polymer is a mixture of a polyaminopolyolefin and a polyetheramine. In certain embodiments, the molar ratio of the polyaminopolyolefin versus the polyetheramine in the copolymer is ranging from about 0.1 to about 100, from about 0.2 to about 50, from about 0.5 to about 25, from about 1 to about 10, or from about 1 to about 5. In certain embodiments, the molar ratio of the polyaminopolyolefin versus the polyetheramine in the copolymer is from about 1 to about 5. In certain embodiments, the molar ratio of the polyaminopolyolefin versus the polyetheramine in the copolymer is about 1, about 1.5, about 2, about 2.5, about 3, about 3.5, about 4, about 4.5, or about 5.

In certain embodiments, the polyaminopolymer has a weight average molecular weight ranging from about 100 to about 100,000, from about 200 to about 50,000, from about 500 to about 20,000, from about 1,000 to about 10,000, from about 1,000 to about 5,000.

In certain embodiments, the polyaminopolymer has a number average molecular weight ranging from about 100 to about 100,000, from about 200 to about 50,000, from about 500 to about 20,000, from about 1,000 to about 10,000, from about 1,000 to about 5,000.

In certain embodiments, the polyaminopolymer has a polydispersity index of no greater than about 2, no greater than about 1.8, no greater than about 1.6, no greater than about 1.5, no greater than about 1.4, no greater than about 1.3, no greater than about 1.2, or no greater than about 1.1.

In one embodiment, the polyaminopolymer comprises a polyamino-PIB. In another embodiment, the polyaminopolymer is a polyamino-PIB.

In one embodiment, the polyaminopolymer comprises a polyamino-PIB and a polyaminopoly(propylene oxide). In another embodiment, the polyamino polymer is a mixture of a polyamino-PIB and a polyaminopoly(propylene oxide). In certain embodiments, the molar ratio of the polyamino-PIB versus the polyaminopoly(propylene oxide) in the copolymer is ranging from about 0.1 to about 100, from about 0.2 to about 50, from about 0.5 to about 25, from about 1 to about 10, or from about 1 to about 5. In certain embodiments, the molar ratio of the polyamino-PIB versus the polyaminopoly(propylene oxide) in the copolymer is from about 1 to about 5. In certain embodiments, the molar ratio of the polyamino-PIB versus the polyaminopoly(propylene oxide) in the copolymer is about 1, about 1.5, about 2, about 2.5, about 3, about 3.5, about 4, about 4.5, or about 5.

In one embodiment, the polyaminopolymer is a diaminopolymer that contains two amino groups. In another embodiment, the diaminopolymer contains two primary amino groups.

In one embodiment, the diaminopolymer comprises a diaminopolyolefin. In another embodiment, the diaminopolymer is a diaminopolyolefin.

In one embodiment, the diaminopolymer comprises a diaminopolyolefin and a polyetherdiamine. In another embodiment, the diaminopolymer is a mixture of a diaminopolyolefin and a polyetherdiamine. In certain embodiments, the molar ratio of the diaminopolyolefin versus the polyetherdiamine in the copolymer is ranging from about 0.1 to about 100, from about 0.2 to about 50, from about 0.5 to about 25, from about 1 to about 10, or from about 1 to about 5. In certain embodiments, the molar ratio of the diaminopolyolefin versus the polyetherdiamine in the copolymer is from about 1 to about 5. In certain embodiments, the molar ratio of the diaminopolyolefin versus the polyetherdiamine in the copolymer is about 1, about 1.5, about 2, about 2.5, about 3, about 3.5, about 4, about 4.5, or about 5.

In one embodiment, the diaminopolymer comprises a diamino-PIB. In another embodiment, the diaminopolymer is a diamino-PIB.

In one embodiment, the diaminopolymer comprises a diamino-PIB and a diaminopoly(propylene oxide). In another embodiment, the diaminopolymer is a mixture of a diamino-PIB and a diaminopoly(propylene oxide). In certain embodiments, the molar ratio of the diamino-PIB versus the diaminopoly(propylene oxide) in the copolymer is ranging from about 0.1 to about 100, from about 0.2 to about 50, from about 0.5 to about 25, from about 1 to about 10, or from about 1 to about 5. In certain embodiments, the molar ratio of the diamino-PIB versus the diaminopoly(propylene oxide) in the copolymer is from about 1 to about 5. In certain embodiments, the molar ratio of the diamino-PIB versus the diaminopoly(propylene oxide) in the copolymer is about 1, about 1.5, about 2, about 2.5, about 3, about 3.5, about 4, about 4.5, or about 5.

i. Polyaminopolyolefins

In one embodiment, the polyaminopolymer is a polyolefin contains two or more amino groups. In certain embodiments, the polyaminopolyolefin contains two, three, or four amino groups. In certain embodiments, the polyaminopolyolefin contains two amino groups. In certain embodiments, the polyaminopolyolefin contains three amino groups. In certain embodiments, the polyaminopolyolefin contains four amino groups.

In another embodiment, the polyaminopolyolefin contains two or more primary amino groups. In certain embodiments, the polyaminopolyolefin contains two, three, or four primary amino groups. In certain embodiments, the polyaminopolyolefin contains two primary amino groups. In certain embodiments, the polyaminopolyolefin contains three primary amino groups. In certain embodiments, the polyaminopolyolefin contains four primary amino groups.

In certain embodiments, the polyaminopolyolefin is a quasi-living polyaminopolyolefin. In certain embodiments, the polyaminopolyolefin is a polyamino-PIB. In certain embodiments, the polyaminopolyolefin is a quasi-living polyamino-PIB.

In certain embodiments, the polyaminopolyolefin is a diaminopolyolefin. In certain embodiments, the diaminopolyolefin is a quasi-living diaminopolyolefin. In certain embodiments, the diaminopolyolefin is a diamino-PIB. In certain embodiments, the diaminopolyolefin is a quasi-living diamino-PIB.

In certain embodiments, the polyaminopolyolefin has a weight average molecular weight ranging from about 100 to about 10,000, from about 200 to about 5,000, from about 500 to about 5,000, from about 1,000 to about 5,000, from about 2,000 to about 5,000, or from about 4,000 to about 5,000. In certain embodiments, the polyaminopolyolefin has a weight average molecular weight ranging from about 1,000 to about 10,000, from about 2,000 to about 10,000, or from about 2,000 to about 5,000. In certain embodiments, the polyaminopolyolefin has a weight average molecular weight of about 1,000, about 2,000, about 3,000, about 4,000, or about 5,000.

In certain embodiments, the polyaminopolyolefin has a number average molecular weight ranging from about 100 to about 10,000, from about 200 to about 5,000, from about 500 to about 5,000, from about 1,000 to about 5,000, from about 2,000 to about 5,000, or from about 4,000 to about 5,000. In certain embodiments, the polyaminopolyolefin has a number average molecular weight ranging from about 1,000 to about 10,000, from about 2,000 to about 10,000, or from about 2,000 to about 5,000. In certain embodiments, the polyaminopolyolefin has a number average molecular weight of about 1,000, about 2,000, about 3,000, about 4,000, or about 5,000.

In certain embodiments, the polyaminopolyolefin has a polydispersity index of no greater than about 2, no greater than about 1.8, no greater than about 1.6, no greater than about 1.5, no greater than about 1.4, no greater than about 1.3, no greater than about 1.2, or no greater than about 1.1.

In one embodiment, the polyaminopolyolefin has the structure of Formula I:

wherein:
each L is independently a bond, alkylene, alkenylene, cycloalkylene, arylene, heteroarylene, or heterocyclylene;
each Z is independently a bond, —O—, —S—, —NR$^z$—, —C(O)—, —C(O)NR$^z$—, —OC(O)NR$^z$—, —NR$^z$C(O)NR$^z$—, or —NR$^z$C(NR$^z$)NR$^z$—; where each R$^Z$ is independently hydrogen or alkyl;
each R$^b$ is independently a divalent oligoolefin group;
R$^x$ is an initiator residue of functionality r;
each R$^1$ and R$^2$ are independently hydrogen, hydroxy, or alkyl;
each m is independently an integer of 0, 1, 2, 3, 4, 5, 6, 7, 8, 9, 10, 11, 12, 13, 14, 15, 16, 17, 18, 19, or 20; and
r is an integer of 2, 3, 4, 5, 6, 7, or 8;
wherein the alkyl, alkylene, alkenylene, cycloalkylene, arylene, heteroarylene, and heterocyclylene are each independently and optionally substituted.

In one embodiment, the polyaminopolyolefin of Formula I has the structure of Formula II:

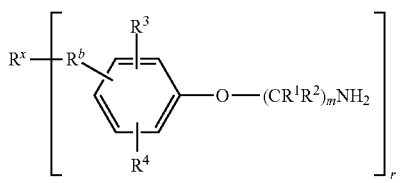

(II)

wherein each $R^3$ and $R^4$ are independently hydrogen, alkyl, or alkoxy, where the alkyl and alkoxy are each independently and optionally substituted; and $R^1$, $R^2$, $R^b$, $R^x$, m, and r are each as defined herein.

In one embodiment, the polyaminopolyolefin of Formula II has the structure of Formula II-1:

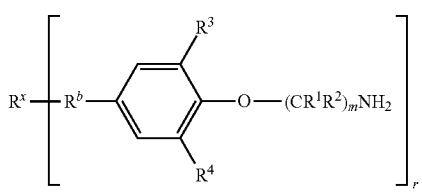

(II-1)

wherein $R^1$, $R^2$, $R^3$, $R^4$, $R^b$, $R^x$, m, and r are each as defined herein.

In another embodiment, the polyaminopolyolefin of Formula II has the structure of Formula II-2:

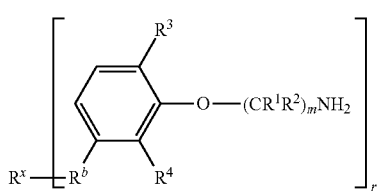

(II-2)

wherein $R^1$, $R^2$, $R^3$, $R^4$, $R^b$, $R^x$, m, and r are each as defined herein.

In yet another embodiment, the polyaminopolyolefin of Formula II has the structure of Formula II-3:

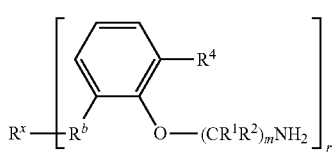

(II-3)

wherein $R^1$, $R^2$, $R^4$, $R^b$, $R^x$, m, and r are each as defined herein.

In one embodiment, the polyaminopolyolefin of Formula II is a diaminopolyolefin of Formula II-4:

(II-4)

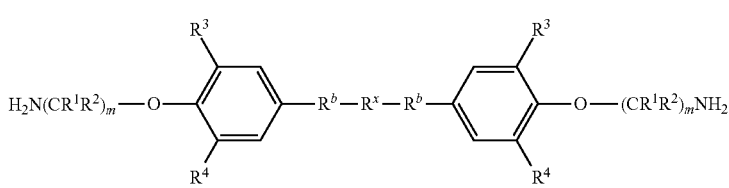

wherein $R^1$, $R^2$, $R^3$, $R^4$, $R^b$, $R^x$, and m are each as defined herein.

In another embodiment, the polyaminopolyolefin of Formula II is a diaminopolyolefin of Formula II-5:

(II-5)

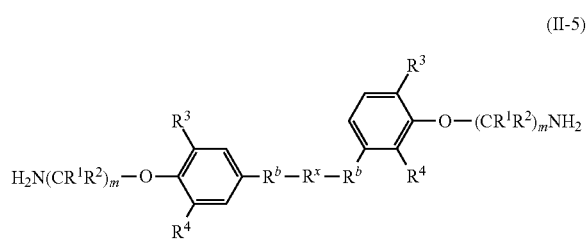

wherein $R^1$, $R^2$, $R^3$, $R^4$, $R^b$, $R^x$, and m are each as defined herein.

In yet another embodiment, the polyaminopolyolefin of Formula II is a diaminopolyolefin of Formula II-6:

(II-6)

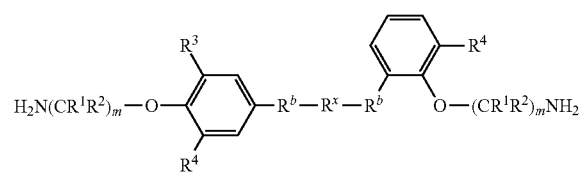

wherein $R^1$, $R^2$, $R^3$, $R^4$, $R^b$, $R^x$, and m are each as defined herein.

In yet another embodiment, the polyaminopolyolefin of Formula II is a diaminopolyolefin of Formula II-7:

(II-7)

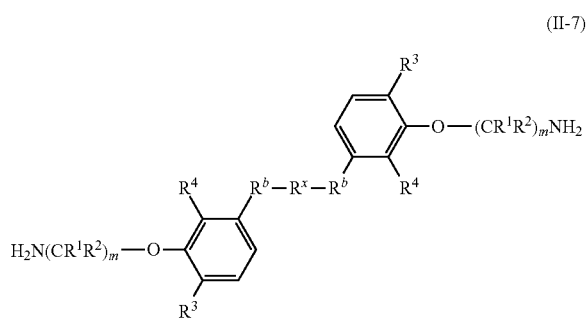

wherein $R^1$, $R^2$, $R^3$, $R^4$, $R^b$, $R^x$, and m are each as defined herein.

In yet another embodiment, the polyaminopolyolefin of Formula II is a diaminopolyolefin of Formula II-8:

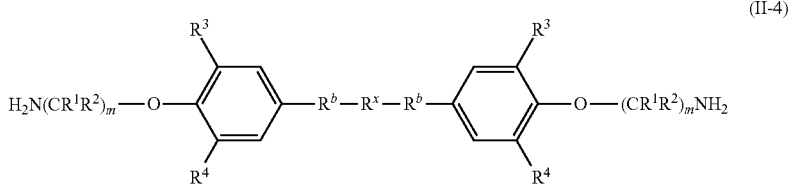

(II-8)

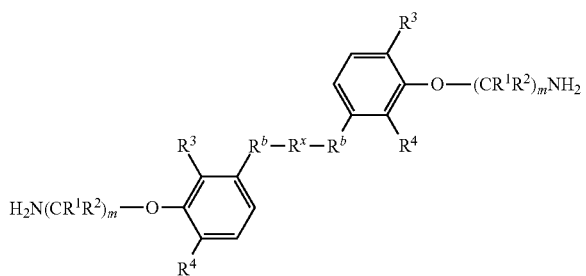

wherein $R^1$, $R^2$, $R^3$, $R^4$, $R^b$, $R^x$, and m are each as defined herein.

In yet another embodiment, the polyaminopolyolefin of Formula II is a diaminopolyolefin of Formula II-9:

(II-9)

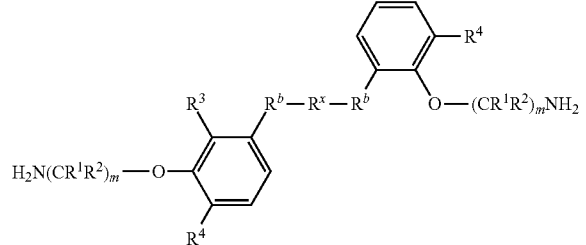

wherein $R^1$, $R^2$, $R^3$, $R^4$, $R^b$, $R^x$, and m are each as defined herein.

In still another embodiment, the polyaminopolyolefin of Formula II is a diaminopolyolefin of Formula II-10:

(II-10)

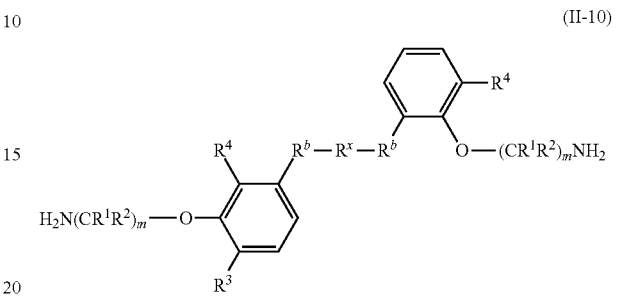

wherein $R^1$, $R^2$, $R^3$, $R^4$, $R^b$, $R^x$, and m are each as defined herein.

In one embodiment, the polyaminopolyolefin of Formula II is a diamino-PIB of Formula III:

(III)

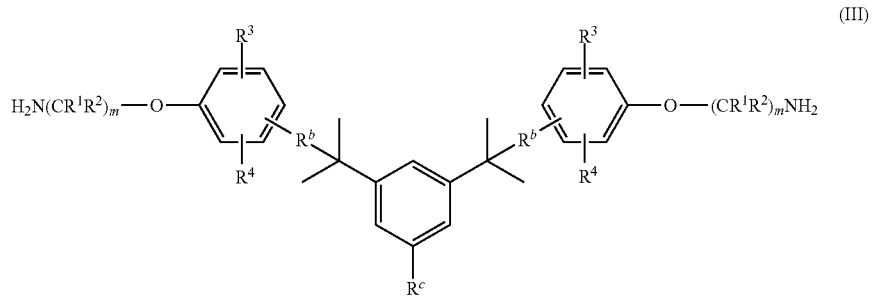

wherein $R^b$ is a divalent oligoisobutylene group and $R^c$ is hydrogen or alkyl, where the alkyl is optionally substituted; and $R^1$, $R^2$, $R^3$, $R^4$, and m are each as defined herein.

In one embodiment, the diamino-PIB of Formula III has the structure of Formula III-1:

(III-1)

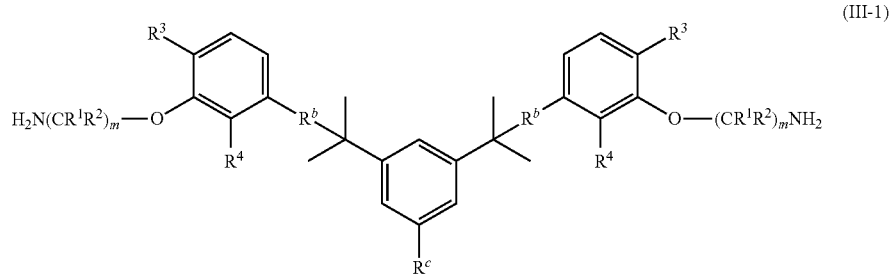

wherein $R^1$, $R^2$, $R^3$, $R^4$, $R^b$, $R^c$, and m are each as defined herein.

In another embodiment, the diamino-PIB of Formula III has the structure of Formula III-2:

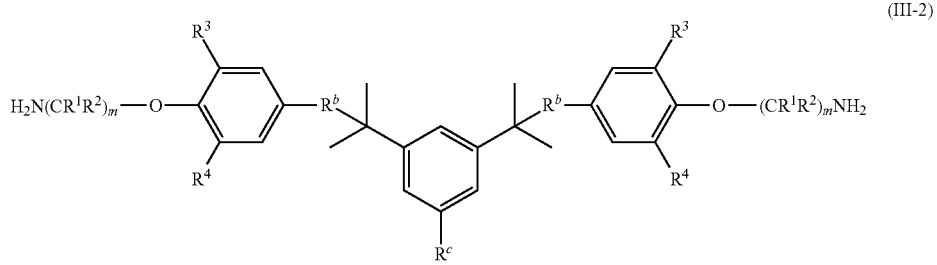

(III-2)

wherein $R^1$, $R^2$, $R^3$, $R^4$, $R^b$, $R^c$, and m are each as defined herein.

In yet another embodiment, the diamino-PIB of Formula III has the structure of Formula III-3:

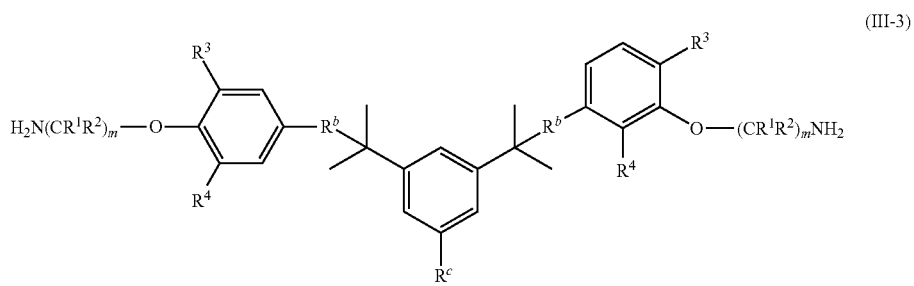

(III-3)

wherein $R^1$, $R^2$, $R^3$, $R^4$, $R^b$, $R^c$, and m are each as defined herein.

In yet another embodiment, the diamino-PIB of Formula III has the structure of Formula III-4:

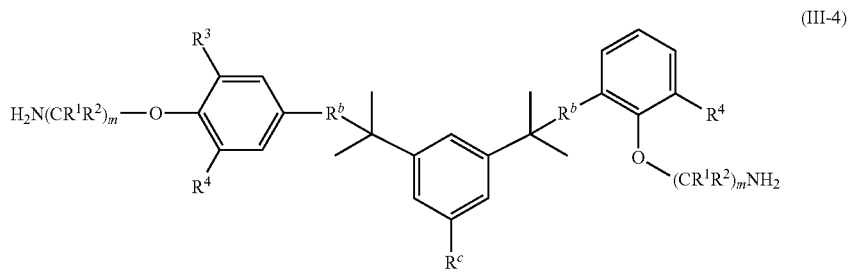

(III-4)

wherein $R^1$, $R^2$, $R^3$, $R^4$, $R^b$, $R^c$, and m are each as defined herein.

In yet another embodiment, the diamino-PIB of Formula III has the structure of Formula III-5:

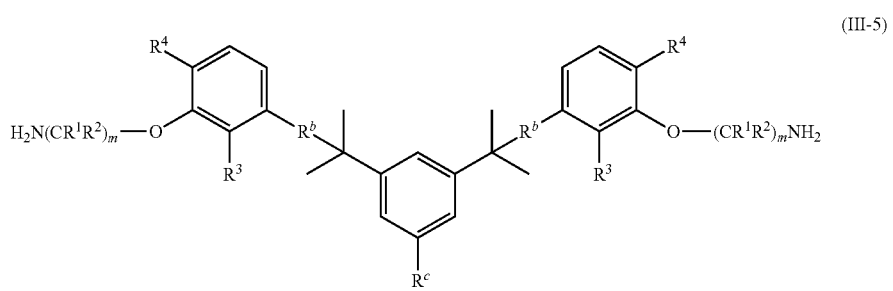

(III-5)

wherein $R^1$, $R^2$, $R^3$, $R^4$, $R^b$, $R^c$, and m are each as defined herein.

In yet another embodiment, the diamino-PIB of Formula III has the structure of Formula III-6:

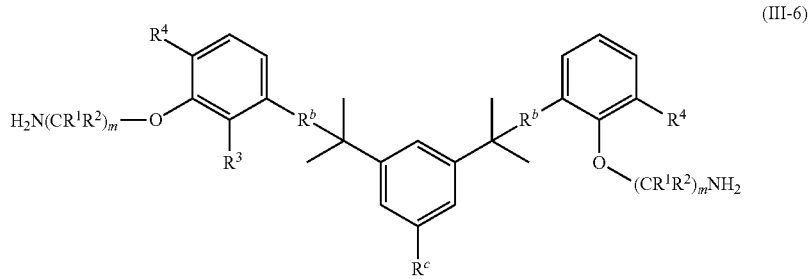

wherein $R^1$, $R^2$, $R^3$, $R^4$, $R^b$, $R^c$, and m are each as defined herein.

In yet another embodiment, the diamino-PIB of Formula III has the structure of Formula III-7:

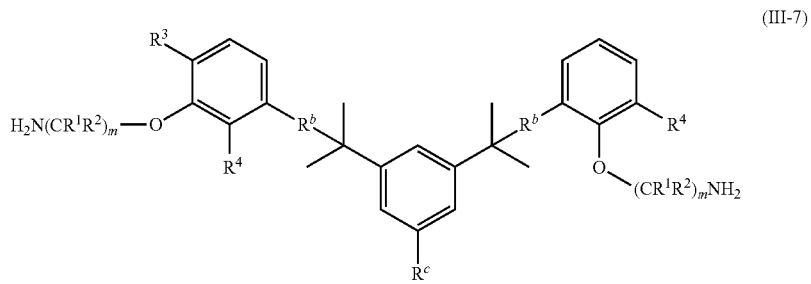

wherein $R^1$, $R^2$, $R^3$, $R^4$, $R^b$, $R^c$, and m are each as defined herein.

In still another embodiment, the diamino-PIB of Formula III has the structure of Formula III-8:

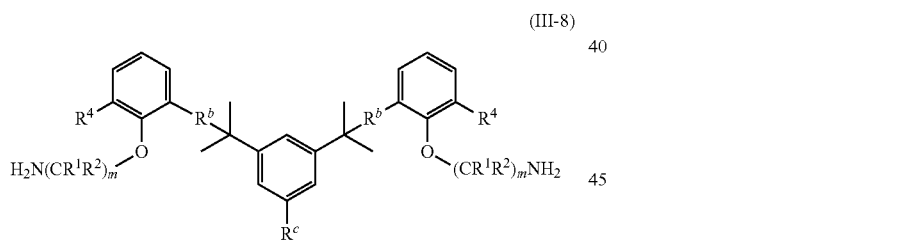

wherein $R^1$, $R^2$, $R^4$, $R^b$, $R^c$, and m are each as defined herein.

In another embodiment, the polyaminopolyolefin of Formula II is a diamino-PIB of Formula IV:

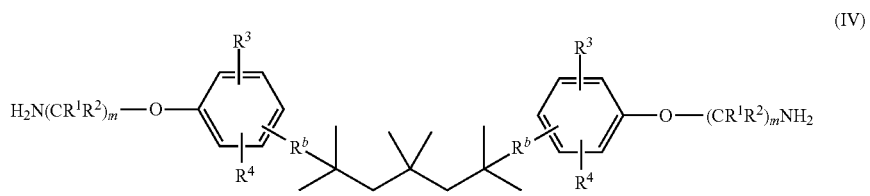

wherein $R^1$, $R^2$, $R^3$, $R^4$, $R^b$, and m are each as defined herein.

In one embodiment, the diamino-PIB of Formula IV has the structure of Formula IV-1:

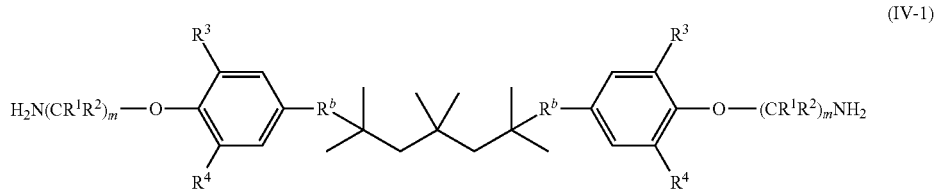
(IV-1)

wherein $R^1$, $R^2$, $R^3$, $R^4$, $R^b$, and m are each as defined herein.

In another embodiment, the diamino-PIB of Formula IV has the structure of Formula IV-2:

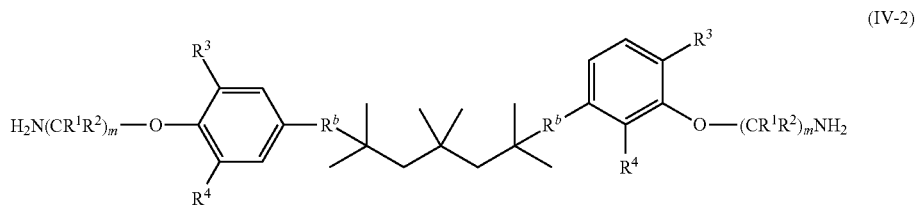
(IV-2)

wherein $R^1$, $R^2$, $R^3$, $R^4$, $R^b$, and m are each as defined herein.

In yet another embodiment, the diamino-PIB of Formula IV has the structure of Formula IV-3:

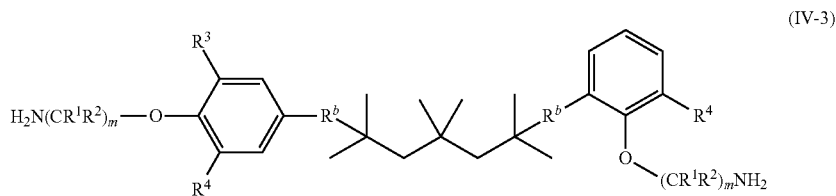
(IV-3)

wherein $R^1$, $R^2$, $R^3$, $R^4$, $R^b$, and m are each as defined herein.

In yet another embodiment, the diamino-PIB of Formula IV has the structure of Formula IV-4:

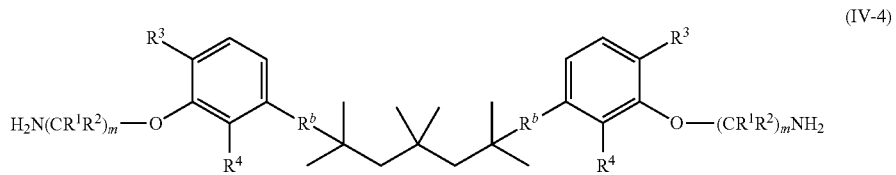
(IV-4)

wherein $R^1$, $R^2$, $R^3$, $R^4$, $R^b$, and m are each as defined herein.

In yet another embodiment, the diamino-PIB of Formula IV has the structure of Formula IV-5:

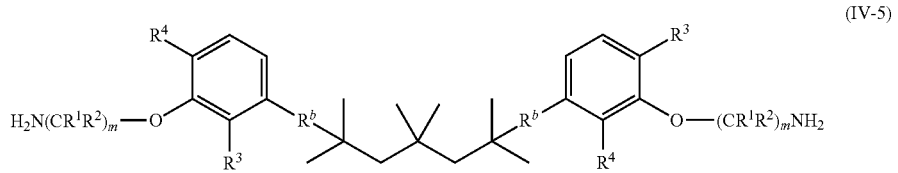
(IV-5)

wherein $R^1$, $R^2$, $R^3$, $R^4$, $R^b$, and m are each as defined herein.

In yet another embodiment, the diamino-PIB of Formula IV has the structure of Formula IV-6:

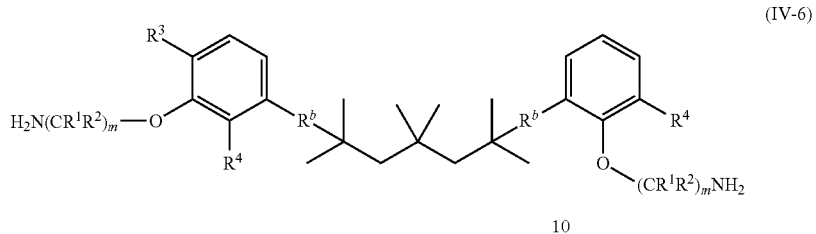

wherein $R^1$, $R^2$, $R^3$, $R^4$, $R^b$, and m are each as defined herein.

In yet another embodiment, the diamino-PIB of Formula IV has the structure of Formula IV-7:

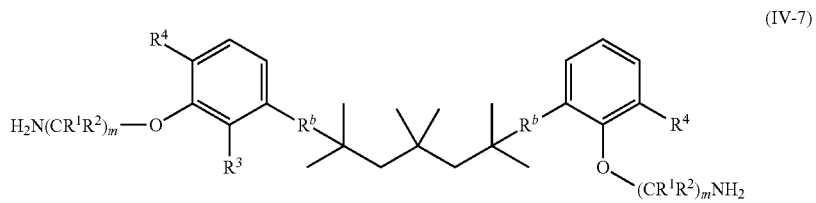

wherein $R^1$, $R^2$, $R^3$, $R^4$, $R^b$, and m are each as defined herein.

In still another embodiment, the diamino-PIB of Formula IV has the structure of Formula IV-8:

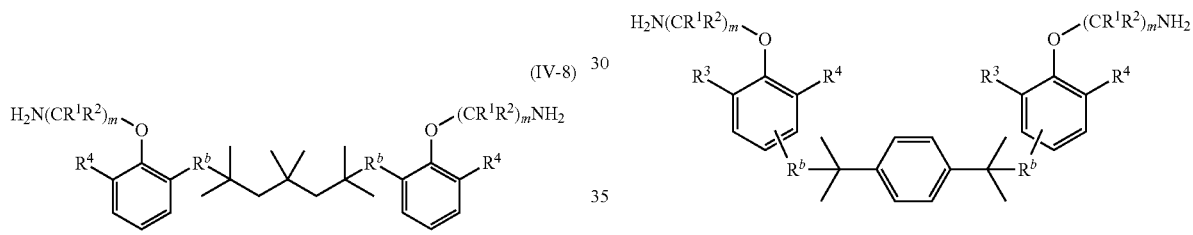

wherein $R^1$, $R^2$, $R^4$, $R^b$, and m are each as defined herein.

In yet another embodiment, the polyaminopolyolefin of Formula II is a diamino-PIB of Formula V:

wherein $R^1$, $R^2$, $R^3$, $R^4$, $R^b$, and m are each as defined herein.

In one embodiment, the diamino-PIB of Formula V has the structure of Formula V-1:

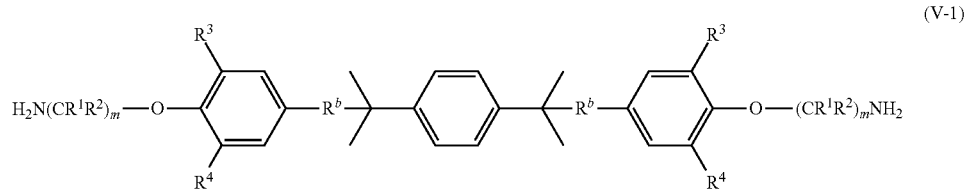

wherein $R^1$, $R^2$, $R^3$, $R^4$, $R^b$, and m are each as defined herein.

In another embodiment, the diamino-PIB of Formula V has the structure of Formula V-2:

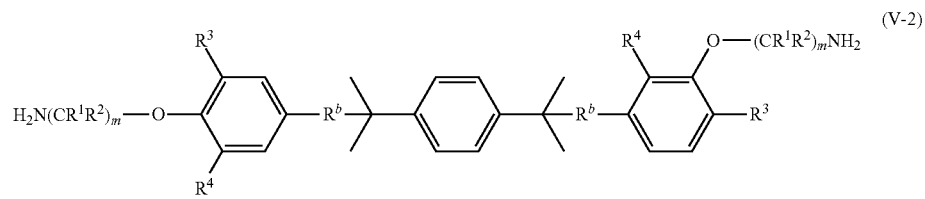

wherein $R^1$, $R^2$, $R^3$, $R^4$, $R^b$, and m are each as defined herein.

In yet another embodiment, the diamino-PIB of Formula V has the structure of Formula V-3:

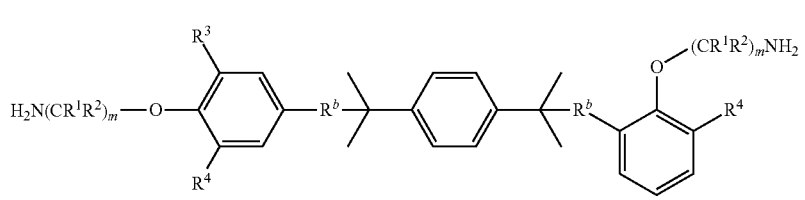
(V-3)

wherein $R^1$, $R^2$, $R^3$, $R^4$, $R^b$, and m are each as defined herein.

In yet another embodiment, the diamino-PIB of Formula V has the structure of Formula V-4:

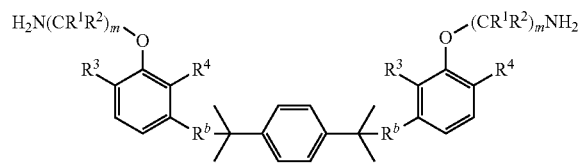
(V-4)

wherein $R^1$, $R^2$, $R^3$, $R^4$, $R^b$, and m are each as defined herein.

In yet another embodiment, the diamino-PIB of Formula V has the structure of Formula V-5:

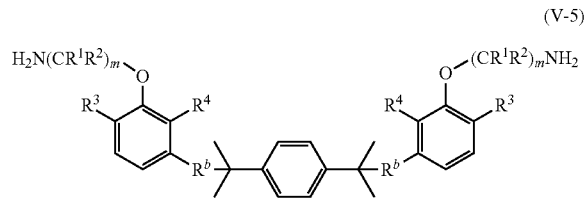
(V-5)

wherein $R^1$, $R^2$, $R^3$, $R^4$, $R^b$, and m are each as defined herein.

In yet another embodiment, the diamino-PIB of Formula V has the structure of Formula V-6:

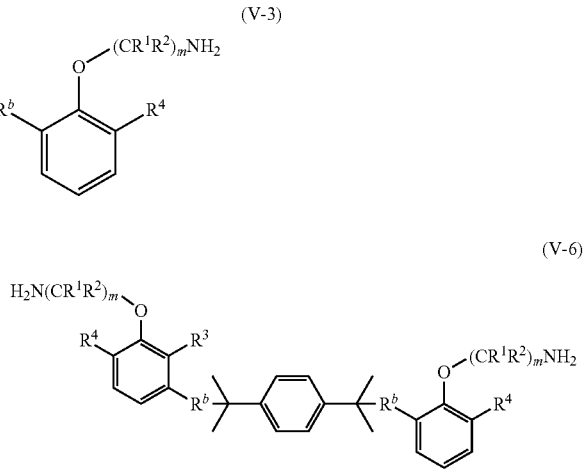
(V-6)

wherein $R^1$, $R^2$, $R^3$, $R^4$, $R^b$, and m are each as defined herein.

In yet another embodiment, the diamino-PIB of Formula V has the structure of Formula V-7:

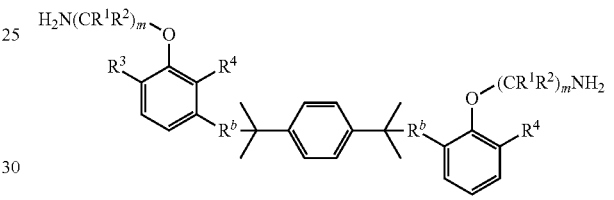
(V-7)

wherein $R^1$, $R^2$, $R^3$, $R^4$, $R^b$, and m are each as defined herein.

In still another embodiment, the diamino-PIB of Formula V has the structure of Formula V-8:

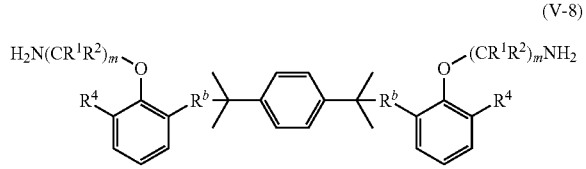
(V-8)

wherein $R^1$, $R^2$, $R^4$, $R^b$, and m are each as defined herein.

In yet another embodiment, the polyaminopolyolefin of Formula II is a triamino-PIB of Formula VI:

(VI)
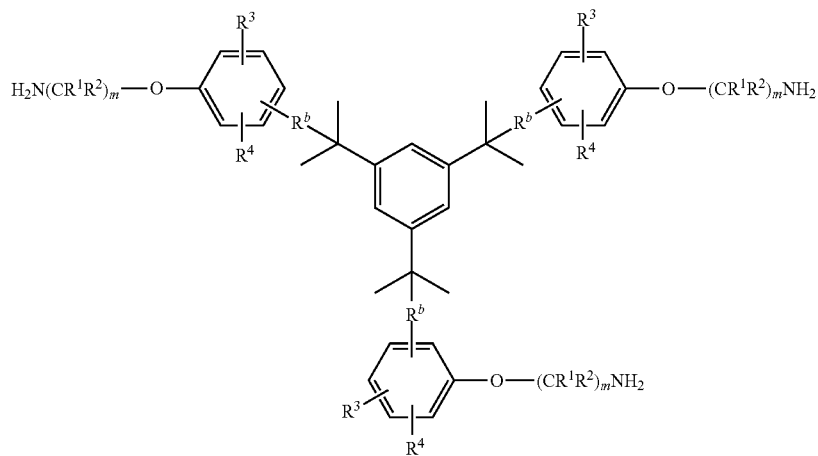

wherein $R^1$, $R^2$, $R^3$, $R^4$, $R^b$, and m are each as defined herein.

In one embodiment, the triamino-PIB of Formula VI has the structure of Formula VI-1:

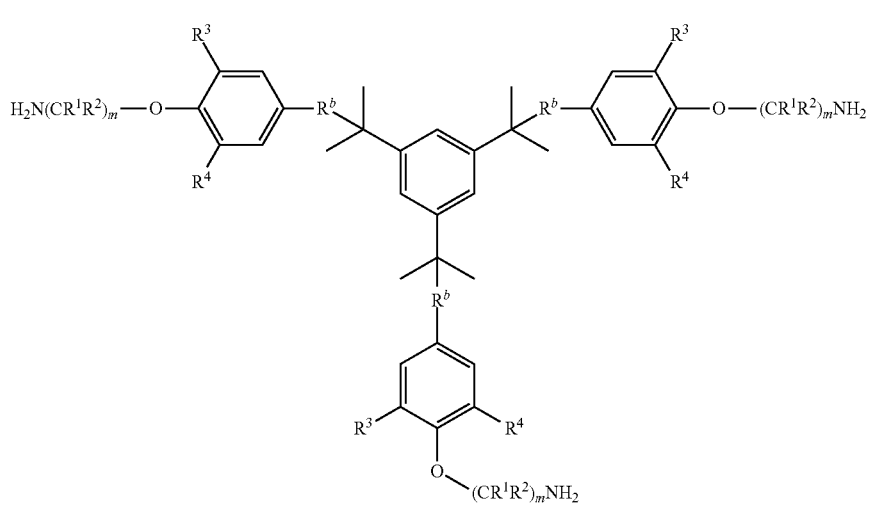
(VI-1)

wherein $R^1$, $R^2$, $R^3$, $R^4$, $R^b$, and m are each as defined herein.

In another embodiment, the polyaminopolyolefin of Formula I has the structure of Formula VII:

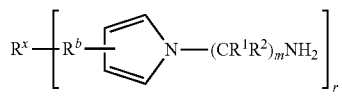
(VII)

wherein $R^1$, $R^2$, $R^b$, $R^x$, m, and r are each as defined herein.

In one embodiment, the polyaminopolyolefin of Formula VII has the structure of Formula VII-1:

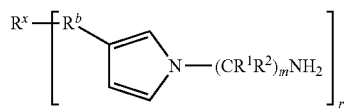
(VII-1)

wherein $R^1$, $R^2$, $R^b$, $R^x$, m, and r are each as defined herein.

In another embodiment, the polyaminopolyolefin of Formula VII has the structure of Formula VII-2:

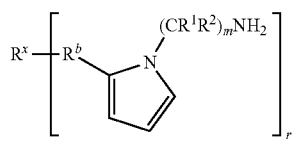
(VII-2)

wherein $R^1$, $R^2$, $R^b$, $R^x$, m, and r are each as defined herein.

In another embodiment, the polyaminopolyolefin of Formula VII is a diamino-PIB of Formula VIII:

(VIII)

wherein $R^1$, $R^2$, $R^b$, $R^x$, and m are each as defined herein.

In one embodiment, the diamino-PIB of Formula VIII has the structure of Formula VIII-1:

(VIII-1)

wherein $R^1$, $R^2$, $R^3$, $R^4$, $R^b$, $R^x$, and m are each as defined herein.

In another embodiment, the diamino-PIB of Formula VIII has the structure of Formula VIII-2:

(VIII-2)

wherein $R^1$, $R^2$, $R^b$, $R^x$, and m are each as defined herein.

In another embodiment, the polyaminopolyolefin of Formula VIII is a diamino-PIB of Formula IX:

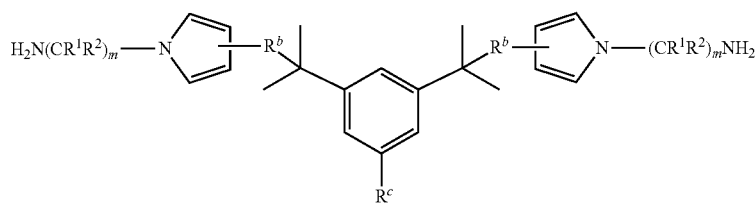
(IX)

wherein $R^1$, $R^2$, $R^b$, $R^c$, and m are each as defined herein.

In one embodiment, the diamino-PIB of Formula IX has the structure of Formula IX-1:

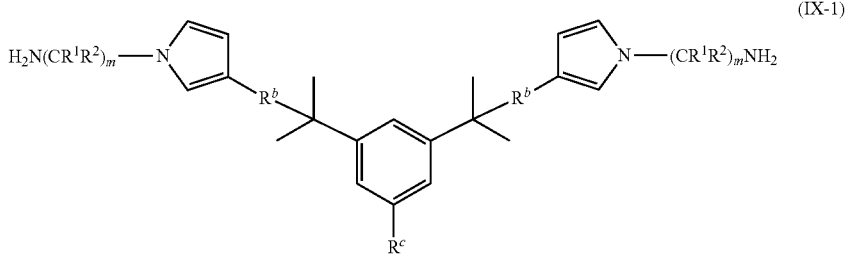
(IX-1)

wherein $R^1$, $R^2$, $R^b$, $R^c$, and m are each as defined herein.

In another embodiment, the diamino-PIB of Formula IX has the structure of Formula IX-2:

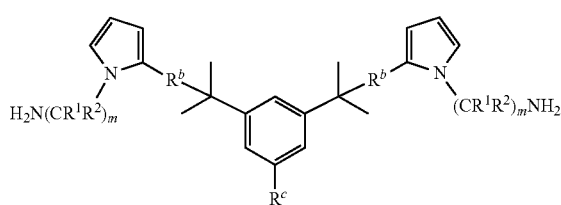
(IX-2)

wherein $R^1$, $R^2$, $R^b$, $R^c$, and m are each as defined herein.

In yet another embodiment, the diamino-PIB of Formula IX has the structure of Formula IX-3:

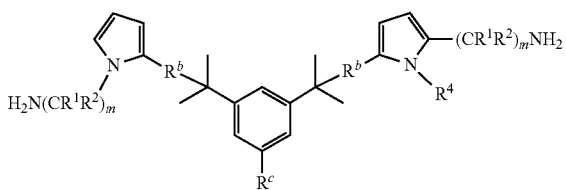

wherein $R^1$, $R^2$, $R^4$, $R^b$, $R^c$, and m are each as defined herein.

In yet another embodiment, the polyaminopolyolefin of Formula I has the structure of Formula X:

(X)

wherein $R^1$, $R^2$, $R^b$, $R^x$, m, and r are each as defined herein.

In one embodiment, the polyaminopolyolefin of Formula X is a diamino-PIB of Formula X-1:

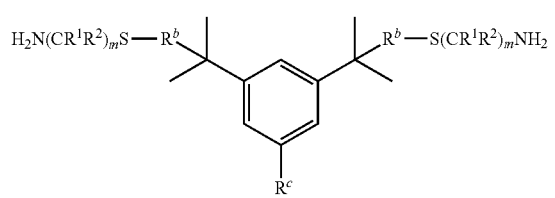
(X-1)

wherein $R^1$, $R^2$, $R^b$, $R^c$, and m are each as defined herein.

In another embodiment, the polyaminopolyolefin of Formula X is a diamino-PIB of Formula X-2:

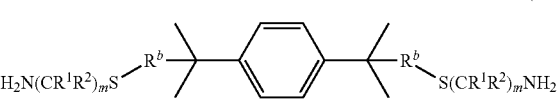
(X-2)

wherein $R^1$, $R^2$, $R^b$, and m are each as defined herein.

In yet another embodiment, the polyamino polyolefin of Formula X is a diamino-PIB of Formula X-3:

(X-3)

wherein $R^1$, $R^2$, $R^b$, and m are each as defined herein.

In yet another embodiment, the polyaminopolyolefin has the structure of Formula XI:

(XI)

wherein $R^b$, $R^x$, and r are each as defined herein.

In yet another embodiment, the polyaminopolyolefin has the structure of Formula XII:

(XII)

wherein $R^1$, $R^2$, $R^b$, $R^x$, m, r, and Z are each as defined herein.

In one embodiment, the polyaminopolyolefin has the structure of Formula XII-1:

(XII-1)

wherein $R^1$, $R^2$, $R^b$, $R^x$, m, and r are each as defined herein. In certain embodiments, $R^1$ and $R^2$ are hydrogen and m is 0, 1, 2, or 3. Examples of polyaminopolyolefins of Formula XII-1 include, but are not limited to, those disclosed in U.S. Pat. No. 4,832,702; Percec et al., *Polymer Bulletin* 1983, 9, 27-32; Ummadisetty et al., *J. Polymer Science: Part A: Polymer Chemistry* 2008, 46, 4236-4242; and Koroskenyi et al., *J. Macromol. Chem. Pure Appl. Chem.* 1999, A36, 1879-1893; the disclosure of each of which is incorporated herein by reference in its entirety.

In another embodiment, the polyaminopolyolefin has the structure of Formula XII-2:

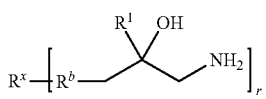
(XII-2)

wherein $R^1$, $R^b$, $R^x$, and r are each as defined herein. Examples of polyaminopolyolefins of Formula XII-2 include, but are not limited to, those disclosed in Wollyung et al., *J. Polymer Science: Part A: Polymer Chemistry* 2005, 43, 946-958; the disclosure of which is incorporated herein by reference in its entirety.

In yet another embodiment, the polyaminopolyolefin has the structure of Formula XII-3:

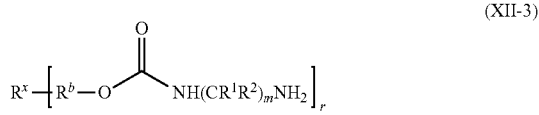

(XII-3)

wherein $R^1$, $R^2$, $R^b$, $R^x$, m, and r are each as defined herein. In certain embodiments, $R^1$ and $R^2$ are hydrogen and m is 2 or 3. Examples of polyaminopolyolefins of Formula XII-3 include, but are not limited to, those disclosed in Keki et al., *J. Polymer Science: Part A: Polymer Chemistry* 2004, 42, 587-596; the disclosure of which is incorporated herein by reference in its entirety. In still another embodiment, the polyaminopolyolefin has the structure of Formula XII-4:

(XII-4)

wherein $R^1$, $R^2$, $R^b$, $R^x$, and r are each as defined herein; and m is an integer of 2, 3, 4, 5, 6, 7, 8, 9, 10, 11, 12, 13, 14, 15, 16, 17, 18, 19, or 20. In certain embodiments, $R^1$ and $R^2$ are hydrogen and m is 2 or 3. Examples of polyaminopolyolefins of Formula XII-4 include, but are not limited to, those disclosed in Percec et al., *Polymer Bulletin* 1983, 9, 27-32; the disclosure of which is incorporated herein by reference in its entirety.

In still another embodiment, the polyaminopolyolefin has the structure of Formula XIII:

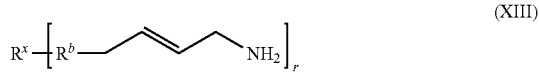

(XIII)

wherein $R^b$, $R^x$, and r are each as defined herein. Examples of polyaminopolyolefins of Formula XIII include, but are not limited to, those disclosed in Higashihara et al., *Macromolecules* 2006, 39, 5275-5279; the disclosure of which is incorporated herein by reference in its entirety.

The groups, $R^1$, $R^2$, $R^3$, $R^4$, $R^5$, $R^6$, $R^b$, $R^c$, $R^x$, L, X, Y, Z, m, n, and r in Formulae provided herein, e.g., Formulae A, I to XIII, II-1 to II-10, III-1 to III-8, IV-1 to IV-8, V-1 to V-8, VI-1, VII-1 and VII-2, VIII-1 and VIII-2, IX-1 and IX-2, X-1 to X-3, and XII-1 to XII-4, are further defined in the embodiments described herein. All combinations of the embodiments provided herein for such groups are within the scope of this disclosure.

In certain embodiments, each $R^1$ is independently hydrogen or alkyl, wherein the alkyl is optionally substituted, in one embodiment, with one or more substituents Q as defined herein. In certain embodiments, each $R^1$ is independently hydrogen or $C_{1-6}$ alkyl, wherein the alkyl is optionally substituted, in one embodiment, with one or more substituents Q as defined herein. In certain embodiments, each $R^1$ is independently hydrogen or methyl. In certain embodiments, each $R^1$ is hydrogen. In certain embodiments, each $R^1$ is hydroxy. In certain embodiments, each $R^1$ is alkyl, optionally substituted, in one embodiment, with one or more substituents Q as defined herein. In certain embodiments, each $R^1$ is $C_{1-6}$ alkyl, optionally substituted, in one embodiment, with one or more substituents Q as defined herein. In certain embodiments, each $R^1$ is methyl.

In certain embodiments, each $R^2$ is independently hydrogen or alkyl, wherein the alkyl is optionally substituted, in one embodiment, with one or more substituents Q as defined herein. In certain embodiments, each $R^2$ is independently hydrogen or $C_{1-6}$ alkyl, wherein the alkyl is optionally substituted, in one embodiment, with one or more substituents Q as defined herein. In certain embodiments, each $R^2$ is independently hydrogen or methyl. In certain embodiments, each $R^2$ is hydrogen. In certain embodiments, each $R^2$ is hydroxy. In certain embodiments, each $R^2$ is alkyl, optionally substituted, in one embodiment, with one or more substituents Q as defined herein. In certain embodiments, each $R^2$ is $C_{1-6}$ alkyl, optionally substituted, in one embodiment, with one or more substituents Q as defined herein. In certain embodiments, each $R^2$ is methyl.

In certain embodiments, each $R^1$ and $R^2$ are independently hydrogen or alkyl, wherein the alkyl is optionally substituted, in one embodiment, with one or more substituents Q as defined herein. In certain embodiments, each $R^1$ and $R^2$ are independently hydrogen or $C_{1-6}$ alkyl, wherein the alkyl is optionally substituted, in one embodiment, with one or more substituents Q as defined herein. In certain embodiments, each $R^1$ and $R^2$ are independently hydrogen or methyl. In certain embodiments, each $R^1$ and $R^2$ are hydrogen. In certain embodiments, each $R^1$ and $R^2$ are independently alkyl, optionally substituted, in one embodiment, with one or more substituents Q as defined herein. In certain embodiments, each $R^1$ and $R^2$ are independently $C_{1-6}$ alkyl, optionally substituted, in one embodiment, with one or more substituents Q as defined herein. In certain embodiments, each $R^1$ and $R^2$ are methyl.

In certain embodiments, each $R^3$ is independently hydrogen, alkyl, or alkoxy, wherein the alkyl and alkoxy are each independently and optionally substituted, in one embodiment, with one or more substituents Q as defined herein. In certain embodiments, each $R^3$ is independently hydrogen, $C_{1-6}$ alkyl, or $C_{1-6}$ alkoxy, wherein the alkyl and alkoxy are each independently and optionally substituted, in one embodiment, with one or more substituents Q as defined herein. In certain embodiments, each $R^3$ is hydrogen. In certain embodiments, each $R^3$ is independently $C_{1-6}$ alkyl, optionally substituted, in one embodiment, with one or more substituents Q as defined herein. In certain embodiments, each $R^3$ is independently $C_{1-6}$ alkoxy, optionally substituted, in one embodiment, with one or more substituents Q as defined herein.

In certain embodiments, each $R^4$ is independently hydrogen, alkyl, or alkoxy, wherein the alkyl and alkoxy are each independently and optionally substituted, in one embodiment, with one or more substituents Q as defined herein. In certain embodiments, each $R^4$ is independently hydrogen, $C_{1-6}$ alkyl, or $C_{1-6}$ alkoxy, wherein the alkyl and alkoxy are each independently and optionally substituted, in one embodiment, with one or more substituents Q as defined herein. In certain embodiments, each $R^4$ is hydrogen. In certain embodiments, each $R^4$ is independently $C_{1-6}$ alkyl, optionally substituted, in one embodiment, with one or more substituents Q as defined herein. In certain embodiments, each $R^4$ is independently $C_{1-6}$ alkoxy, optionally substituted, in one embodiment, with one or more substituents Q as defined herein.

In certain embodiments, each $R^3$ and $R^4$ are hydrogen.

In certain embodiments, $R^5$ is amino. In certain embodiments, $R^5$ is primary amino. In certain embodiments, $R^5$ is secondary amino. In certain embodiments, $R^5$ is tertiary amino. In certain embodiments, $R^5$ is —$NH_2$. In certain embodiments, $R^5$ is amido. In certain embodiments, $R^5$ is acylamino. In certain embodiments, $R^5$ is acetylamino. In certain embodiments, $R^5$ is imido. In certain embodiments, $R^5$ is phthalimido.

In certain embodiments, $R^6$ is amino. In certain embodiments, $R^6$ is primary amino. In certain embodiments, $R^6$ is secondary amino. In certain embodiments, $R^6$ is tertiary amino. In certain embodiments, $R^6$ is —$NH_2$. In certain embodiments, $R^6$ is amido. In certain embodiments, $R^6$ is acylamino. In certain embodiments, $R^6$ is acetylamino. In certain embodiments, $R^6$ is imido. In certain embodiments, $R^6$ is phthalimido.

In certain embodiments, $R^5$ and $R^6$ are each independently amino. In certain embodiments, $R^5$ and $R^6$ are —$NH_2$. In certain embodiments, $R^5$ and $R^6$ are each independently amido. In certain embodiments, $R^5$ and $R^6$ are acetylamino. In certain embodiments, $R^5$ and $R^6$ are each independently imido. In certain embodiments, $R^5$ and $R^6$ are phthalimido.

In certain embodiments, each $R^b$ is independently a divalent quasi-living oligoolefin group. In certain embodiments, each $R^b$ is independently a divalent oligoisobutylene group. In certain embodiments, each $R^b$ is independently a divalent quasi-living oligoisobutylene group. In certain embodiments, each $R^b$ is independently a divalent oligoisobutylene group of —$[CH_2$—$C(CH_3)_2]_p$—, wherein p is an integer ranging from about 2 to an about 10,000. In certain embodiments, p is an integer ranging from about 2 to about 5,000. In certain embodiments, p is an integer ranging from about 2 to about 2,000. In certain embodiments, p is an integer ranging from about 5 to about 1,000. In certain embodiments, p is an integer ranging from about 5 to about 500. In certain embodiments, p is an integer ranging from about 5 to about 200. In certain embodiments, p is an integer ranging from about 5 to about 100. In certain embodiments, p is an integer ranging from about 5 to about 50. In certain embodiments, p is an integer of about 5, about 10, about 20, about 30, about 40, or about 50. In certain embodiments, each $R^b$ is independently —$[CH_2$—$C(CH_3)_2]_{20}$— or —$[CH_2$—$C(CH_3)_2]_{40}$—. In certain embodiments, each $R^b$ is —$[CH_2$—$C(CH_3)_2]_{20}$—. In certain embodiments, each $R^b$ is —$[CH_2$—$C(CH_3)_2]_{40}$—.

In certain embodiments, each $R^c$ is independently hydrogen or alkyl, wherein the alkyl is optionally substituted, in one embodiment, with one or more substituents Q as defined herein. In certain embodiments, each $R^c$ is independently hydrogen or $C_{1-6}$ alkyl, wherein the alkyl is optionally substituted, in one embodiment, with one or more substituents Q as defined herein. In certain embodiments, each $R^c$ is independently hydrogen or butyl. In certain embodiments, each $R^c$ is independently hydrogen or t-butyl. In certain embodiments, each $R^c$ is hydrogen. In certain embodiments, each $R^c$ is independently alkyl, optionally substituted, in one embodiment, with one or more substituents Q as defined herein. In certain embodiments, each $R^c$ is independently $C_{1-6}$ alkyl, optionally substituted, in one embodiment, with one or more substituents Q as defined herein. In certain embodiments, each $R^c$ is butyl. In certain embodiments, each $R^c$ is t-butyl.

In certain embodiments, $R^x$ is an initiator residue of functionality r, wherein r is as defined herein. In certain embodiments, $R^x$ is a polyfunctional initiator residue of functionality r, wherein r is as defined herein. In certain embodiments, $R^x$ is a polyfunctional carbocationic initiator residue of functionality r, wherein r is as defined herein. In certain embodiments, $R^x$ is a divalent or trivalent initiator residue. In certain embodiments, $R^x$ is a divalent initiator residue. In certain embodiments, $R^x$ is phenylene or neopentylene, each optionally substituted, in one embodiment, with one or more substituents Q as defined herein. In certain embodiments, $R^x$ is 1,2-phenylene, 1,3-phenylene, or 1,4-phenylene, each optionally substituted, in one embodiment, with one or more substituents Q as defined herein. In certain embodiments, $R^x$ is 1,3-phenylene, 5-t-butyl-1,3-phenylene, or 1,4-phenylene. In certain embodiments, $R^x$ is a trivalent initiator residue. In certain embodiments, $R^x$ is an initiator residue having the structure of:

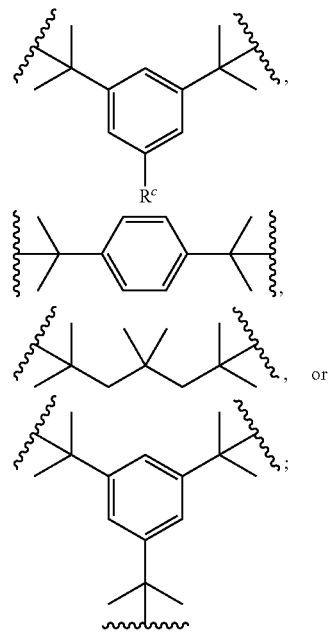

where $R^c$ is as defined herein.

In certain embodiments, $R^x$ is a residue of an initiator, where the initiator is 1,3-di(1-chloro-1-methylethyl)-5-tert-butylbenzene, 1,3-di(1-acetoxy-1-methylethyl)-5-tert-butylbenzene, 1,3-di(1-propionyloxy-1-methylethyl)-5-tert-butylbenzene, 1,3-di(1-methoxy-1-methylethyl)-5-tert-butylbenzene, 1,3-di(1-ethoxy-1-methylethyl)-5-tert-butylbenzene, 1,4-di(1-chloro-1-methylethyl)benzene, 1,4-di(1-acetoxy-1-methylethyl)benzene, 1,4-di(1-propionyloxy-1-methylethyl)benzene, 1,4-di(1-methoxy-1-methylethyl)benzene, 1,4-di(1-ethoxy-1-methylethyl) benzene, 2,6-dichloro-2,4,4,6-tetramethylheptane, 2,6-diacetoxy-2,4,4,6-tetramethylheptane, 2,6-dipropionyloxy-2,4,4,6-tetramethylheptane, 2,6-dimethoxy-2,4,4,6-tetramethylheptane, 2,6-diethoxy-2,4,4,6-tetramethylheptane, 1,3,5 tri(1-chloro-1-methylethyl) benzene, 1,3,5 tri(1-acetoxy-1-methylethyl)benzene, 1,3,5 tri (1-propionyloxy-1-methylethyl)benzene, or 1,3,5-tri(1-methoxy-1-methylethyl)benzene. Additional examples of initiators can be found in U.S. Pat. No. 4,946,899, the disclosure of which is incorporated herein by reference in its entirety.

In certain embodiments, $R^x$ is a residue of a terpene initiator. Examples of terpene initiators can be found, e.g., in U.S. Pat. App. Pub. No. 2011, 0306738, the disclosure of which is incorporated herein by reference in its entirety.

In certain embodiments, each L is independently a bond. In certain embodiments, each L is independently alkylene, wherein the alkylene is optionally substituted with one or more substituents Q as defined herein. In certain embodiments, each L is independently methylene, ethylene, or propylene. In certain embodiments, each L is independently alkenylene, wherein the alkenylene is optionally substituted with one or more substituents Q as defined herein. In certain embodiments, each L is independently allylene. In certain embodiments, each L is independently cycloalkylene, wherein the cycloalkylene is optionally substituted with one or more substituents Q as defined herein. In certain embodiments, each L is independently arylene, wherein the arylene is optionally substituted with one or more substituents Q as defined herein. In certain embodiments, each L is independently phenylene, wherein the phenylene is optionally substituted with one or more substituents Q as defined herein. In certain embodiments, each L is independently 1,2-phenylene, 1,3-phenylene, or 1,4-phenylene, wherein the phenylene is optionally substituted with one or more substituents Q as defined herein. In certain embodiments, each L is independently heteroarylene, wherein the heteroarylene is optionally substituted with one or more substituents Q as defined herein. In certain embodiments, each L is independently heterocyclylene, wherein the heterocyclylene is optionally substituted with one or more substituents Q as defined herein.

In certain embodiments, each L is independently arylene or heteroarylene; wherein the arylene and heteroarylene are each independently and optionally substituted, in one embodiment, with one or more substituents Q as defined herein.

In certain embodiments, each L is independently 5-, 6-, or 7-membered heteroarylene, wherein each heteroarylene is independently and optionally substituted, in one embodiment, with one or more substituents Q as defined herein. In certain embodiments, each L is independently 5-membered heteroarylene, wherein the heteroarylene is optionally substituted, in one embodiment, with one or more substituents Q as defined herein. In certain embodiments, each L is independently pyrrolylene, optionally substituted, in one embodiment, with one or more substituents Q as defined herein. In certain embodiments, each L is independently pyrrol-1,2-ylene, pyrrol-1,3-ylene, pyrrol-2,3-ylene, pyrrol-2,4-ylene, or pyrrol-2,4-ylene, each optionally substituted, in one embodiment, with one or more substituents Q as defined herein. In certain embodiments, each L is pyrrol-1,2-ylene, optionally substituted, in one embodiment, with one or more substituents Q as defined herein. In certain embodiments, each L is pyrrol-1,3-ylene, optionally substituted, in one embodiment, with one or more substituents Q as defined herein. In certain embodiments, each L is pyrrol-2,3-ylene, optionally substituted, in one embodiment, with one or more substituents Q as defined herein. In certain embodiments, each L is pyrrol-2,4-ylene, optionally substituted, in one embodiment, with one or more substituents Q as defined herein. In certain embodiments, each L is pyrrol-2,5-ylene, optionally substituted, in one embodiment, with one or more substituents Q as defined herein. In certain embodiments, each L is independently 6-membered heteroarylene, wherein the heteroarylene is optionally substituted, in one embodiment, with one or more substituents Q as defined herein. In certain embodiments, each L is independently 7-membered heteroarylene, wherein the heteroarylene is optionally substituted, in one embodiment, with one or more substituents Q as defined herein.

In certain embodiments, each X is independently a divalent polyolefin or poly(alkylene oxide) group. In certain embodiments, each X is independently a divalent polyolefin group. In certain embodiments, each X is independently a divalent quasi-living polyolefin group. In certain embodiments, each X is independently a divalent polyisobutylene group. In certain embodiments, each X is independently a divalent quasi-living polyisobutylene group. In certain embodiments, each X is independently —$R^b$—$R^x$—$R^b$—, wherein $R^b$ and $R^x$ are each as defined herein. In certain embodiments, each X is independently:

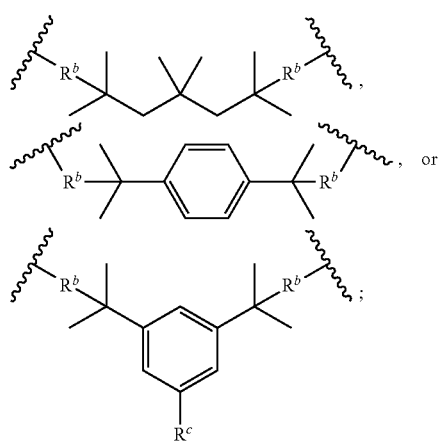

wherein $R^b$ is each as defined herein.

In certain embodiments, each X is independently alkylene, optionally substituted, in one embodiment, with one or more substituents Q as defined herein. In certain embodiments, each X is independently ethylene or propylene, each optionally substituted, in one embodiment, with one or more substituents Q as defined herein. In certain embodiments, each X is independently cycloalkylene, optionally substituted, in one embodiment, with one or more substituents Q as defined herein. In certain embodiments, each X is independently cyclohexylene, optionally substituted, in one embodiment, with one or more substituents Q as defined herein. In certain embodiments, each X is independently arylene, optionally substituted, in one embodiment, with one or more substituents Q as defined herein. In certain embodiments, each X is independently phenylene, optionally substituted, in one embodiment, with one or more substituents Q as defined herein. In certain embodiments, each X is independently heteroarylene, optionally substituted, in one embodiment, with one or more substituents Q as defined herein. In certain embodiments, each X is independently heterocyclylene, optionally substituted, in one embodiment, with one or more substituents Q as defined herein. In certain embodiments, each X is independently. In certain embodiments, each X is independently a divalent poly(alkylene oxide) group. In certain embodiments, each X is independently a divalent polypropylene oxide) group. In certain embodiments, each X is independently a divalent poly(ethylene oxide) group. In certain embodiments, each X is independently a divalent poly(ethoxy/propoxy) group.

In certain embodiments, each Y is independently a divalent moiety containing two amido groups. In certain embodiments, each Y is independently a divalent moiety containing two imido groups. In certain embodiments, each Y is independently a divalent alkyl, alkenyl, alkynyl, cycloalkyl, aryl, heteroaryl, or heterocyclyl group, each of which contains two imido groups; wherein the alkyl, alkenyl, alkynyl, cycloalkyl, aryl, heteroaryl, or heterocyclyl are each independently and optionally substituted, in one embodiment, with one or more substituent Q. In certain embodiments, each Y is independently a divalent alkyl that contains two imido groups; wherein the alkyl is optionally substituted, in one embodiment, with one or more substituent Q. In certain embodiments, each Y is independently a divalent alkenyl that contains two imido groups; wherein the alkenyl is optionally substituted, in one embodiment, with one or more substituent Q. In certain embodiments, each Y is independently a divalent alkynyl that contains two imido groups; wherein the alkynyl is optionally substituted, in one embodiment, with one or more substituent Q. In certain embodiments, each Y is independently a divalent cycloalkyl that contains two imido groups; wherein the cycloalkyl is optionally substituted, in one embodiment, with one or more substituent Q. In certain embodiments, each Y is independently a divalent aryl that contains two imido groups; wherein the aryl is optionally substituted, in one embodiment, with one or more substituent Q. In certain embodiments, each Y is independently a divalent heteroaryl that contains two imido groups; wherein the heteroaryl is optionally substituted, in one embodiment, with one or more substituent Q. In certain embodiments, each Y is independently a divalent heterocyclyl that contains two imido groups; wherein the heterocyclyl is optionally substituted, in one embodiment, with one or more substituent Q.

In certain embodiments, each Y is independently:

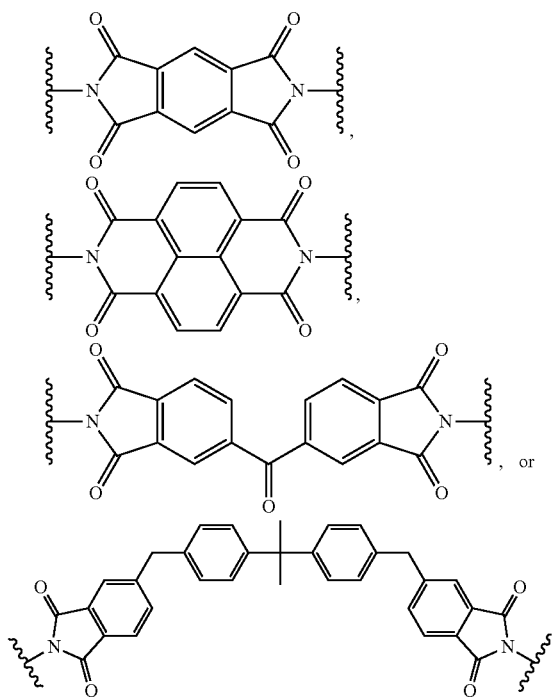

In certain embodiments, each Z is independently a bond. In certain embodiments, each Z is independently —O—. In certain embodiments, each Z is independently —S—. In certain embodiments, each Z is independently —$NR^z$—, wherein $R^z$ is as defined herein. In certain embodiments, each Z is independently —NH— or —$NCH_3$—. In certain embodiments, each Z is independently —C(O)—. In certain embodiments, each Z is independently —C(O)$NR^z$—, wherein $R^z$ is as defined herein. In certain embodiments, each Z is independently —C(O)NH— or —C(O)$NCH_3$—. In certain embodiments, each Z is independently —OC(O)$NR^z$—, wherein $R^z$ is as defined herein. In certain embodiments, each Z is independently —OC(O)NH— or —OC(O)$NCH_3$—. In certain embodiments, each Z is independently —$NR^z$C(O)$NR^z$—, wherein $R^z$ is as defined herein. In certain embodiments, each Z is independently —NHC(O)NH—. In certain embodiments, each Z is independently —$NR^z$C($NR^z$)$NR^z$—, wherein $R^z$ is as defined herein.

In certain embodiments, each m is 0. In certain embodiments, each m is 1. In certain embodiments, each m is 2. In certain embodiments, each m is 3. In certain embodiments, each m is 4. In certain embodiments, each m is 5. In certain embodiments, each m is 6. In certain embodiments, each m is 7. In certain embodiments, each m is 8. In certain embodiments, m is each 9. In certain embodiments, each m is 10. In certain embodiments, each m is 11. In certain embodiments, each m is 12. In certain embodiments, each m is 13. In certain embodiments, each m is 14. In certain embodiments, each m is 15. In certain embodiments, each m is 16. In certain embodiments, m is 17. In certain embodiments, m is 18. In certain embodiments, each m is 19. In certain embodiments, each m is or 20. In certain embodiments, each m is independently an integer ranging from about 2 to about 20. In certain embodiments, each m is independently an integer ranging from about 2 to about 12. In certain embodiments, each m is independently 2, 3, 4, 6, or 11.

In certain embodiments, n is an integer ranging from about 1 to about 100. In certain embodiments, n is an integer ranging from about 1 to about 50. In certain embodiments, n is an integer ranging from about 1 to about 20. In certain embodiments, n is an integer ranging from about 1 to about 10. In certain embodiments, n is about 1, about 2, about 3, about 4, about 5, about 6, about 7, about 8, about 9, or about 10. In certain embodiments, n is about 1. In certain embodiments, n is about 2. In certain embodiments, n is about 3. In certain embodiments, n is about 4. In certain embodiments, n is about 5. In certain embodiments, n is about 6. In certain embodiments, n is about 7. In certain embodiments, n is about 8. In certain embodiments, n is about 9. In certain embodiments, n is about 10.

In certain embodiments, r is 2. In certain embodiments, r is 3. In certain embodiments, r is 4. In certain embodiments, r is 5. In certain embodiments, r is 6. In certain embodiments, r is 7. In certain embodiments, r is 8. In certain embodiments, r is an integer ranging from about 2 to about 8. In certain embodiments, r is an integer ranging from about 2 to about 4.

In certain embodiments, the moiety -L-Z—$(CR^1R^2)_m NH_2$ is each independently:

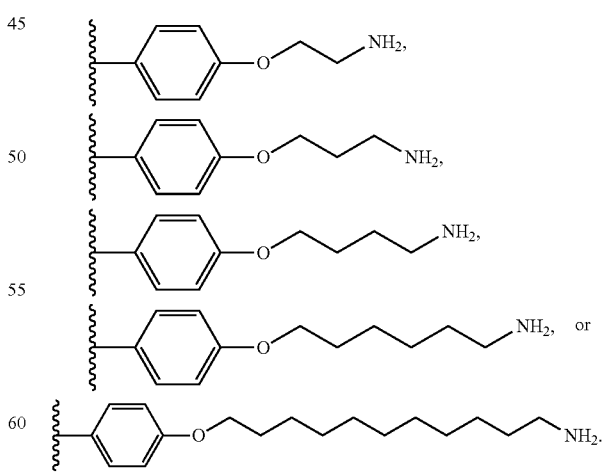

Additional examples of polyaminopolyolefins and their preparation can be found, for example, in U.S. Pat. Nos. 6,969,744; 7,576,161; 7,709,580; and 8,133,954; and U.S. Pat. App. Pub. Nos. 2010/0099835, 2010/0184918, 2010/

0249001, 2010/0311915; 2011/0028681, 2011/0306738, and 2011/0306745, the disclosure of each of which is incorporated by reference herein in its entirety.

ii. Polyetheramines

In one embodiment, the polyetheramine is a polyetherdiamine, i.e., a polyetheramine containing two amino groups. In another embodiment, the polyetheramine is a polyethertriamine, i.e., a polyetheramine containing three amino groups.

In one embodiment, the polyetheramine is a polyaminopoly(propylene oxide). In another embodiment, the polyetheramine is a diaminopoly(propylene oxide). In yet another embodiment, the polyetheramine is a triaminopoly(propylene oxide).

In one embodiment, the polyetheramine is a polyaminopoly(ethylene oxide). In another embodiment, the polyetheramine is a diaminopoly(ethylene oxide). In yet another embodiment, the polyetheramine is a triaminopoly(ethylene oxide).

In one embodiment, the polyetheramine is a polyaminopoly(ethoxy/propoxy). In another embodiment, the polyetheramine is a diaminopoly(ethoxy/propoxy). In yet another embodiment, the polyetheramine is a triaminopoly(ethoxy/propoxy).

In certain embodiments, the polyetheramine has a weight average molecular weight ranging from about 100 to about 10,000, from about 200 to about 5,000, from about 500 to about 5,000, from about 1,000 to about 5,000, from about 2,000 to about 5,000, or from about 4,000 to about 5,000. In certain embodiments, the polyetheramine has a weight average molecular weight ranging from about 1,000 to about 10,000, from about 2,000 to about 10,000, or from about 2,000 to about 5,000. In certain embodiments, the polyetheramine has a weight average molecular weight of about 1,000, about 2,000, about 3,000, about 4,000, or about 5,000.

In certain embodiments, the polyetheramine has a number average molecular weight ranging from about 100 to about 10,000, from about 200 to about 5,000, from about 500 to about 5,000, from about 1,000 to about 5,000, from about 2,000 to about 5,000, or from about 4,000 to about 5,000. In certain embodiments, the polyetheramine has a number average molecular weight ranging from about 1,000 to about 10,000, from about 2,000 to about 10,000, or from about 2,000 to about 5,000. In certain embodiments, the polyetheramine has a number average molecular weight of about 1,000, about 2,000, about 3,000, about 4,000, or about 5,000.

In one embodiment, the polyetherdiamine is a JEFFAMINE® polyetherdiamine. In certain embodiments, the polyetherdiamine is JEFFAMINE® D-230, D-400, D-2000, D-4000 (XTJ-510), HK-511, ED-600 (XTJ-500), ED-900 (XTJ-501), ED-2003 (XTJ-502), EDR-148 (XTJ-504), EDR-176 (XTJ-590), or a mixture thereof. In certain embodiments, the polyetherdiamine is JEFFAMINE® D-400, D-2000, D-4000, or a mixture thereof. In certain embodiments, the polyetherdiamine is JEFFAMINE® D-230. In certain embodiments, the polyetherdiamine is JEFFAMINE® D-400. In certain embodiments, the polyetherdiamine is JEFFAMINE® D-2000. In certain embodiments, the polyetherdiamine is JEFFAMINE® D-4000. In certain embodiments, the polyetherdiamine is JEFFAMINE® HK-511. In certain embodiments, the polyetherdiamine is JEFFAMINE® ED-600. In certain embodiments, the polyetherdiamine is JEFFAMINE® ED-900. In certain embodiments, the polyetherdiamine is JEFFAMINE® ED-2003. In certain embodiments, the polyetherdiamine is JEFFAMINE® EDR-148. In certain embodiments, the polyetherdiamine is JEFFAMINE® EDR-176 (XTJ-590).

In certain embodiments, the polyetherdiamine is a poly(propylene oxide)diamine. In certain embodiments, the polyetherdiamine has the structure of Formula XI-1:

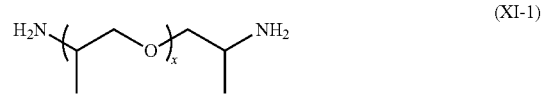

(XI-1)

wherein x is an integer ranging from about 2 to about 100. In certain embodiments, the polyetherdiamine is JEFFAMINE® D-230, having the structure of Formula XI-1, wherein x is about 2 or about 3. In certain embodiments, the polyetherdiamine is JEFFAMINE® D-400, having the structure of Formula XI-1, wherein x is about 6. In certain embodiments, the polyetherdiamine is JEFFAMINE® D-2000, having the structure of Formula XI-1, wherein x is about 33. In certain embodiments, the polyetherdiamine is JEFFAMINE® D-4000, having the structure of Formula XI-1, wherein x is about 68.

In certain embodiments, the polyetherdiamine is a poly(ethoxy/propoxy)diamine. In certain embodiments, the polyetherdiamine has the structure of Formula XI-2:

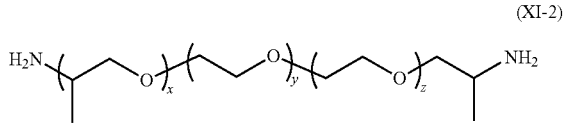

(XI-2)

wherein the total of x and z is ranging from about 1 to about 10 and y is ranging from about 2 to about 100. In certain embodiments, the polyetherdiamine is JEFFAMINE® HK-511, having the structure of Formula XI-2, wherein x+z is about 1 and y is about 2. In certain embodiments, the polyetherdiamine is JEFFAMINE® ED-600, having the structure of Formula XI-2, wherein x+z is about 4 and y is about 9. In certain embodiments, the polyetherdiamine is JEFFAMINE® ED-900, having the structure of Formula XI-2, wherein x+z is about 6 and y is about 13. In certain embodiments, the polyetherdiamine is JEFFAMINE® ED-2003, having the structure of Formula XI-2, wherein x+z is about 6 and y is about 39.

In certain embodiments, the polyetherdiamine has the structure of Formula XI-3:

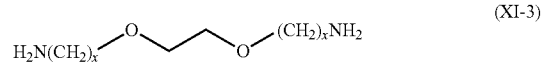

(XI-3)

wherein x is ranging from about 1 to about 10. In certain embodiments, the polyetherdiamine is JEFFAMINE® EDR-148, having the structure of Formula XI-3, wherein x is about 2. In certain embodiments, the polyetherdiamine is JEFFAMINE® EDR-178, having the structure of Formula XI-3, wherein x is about 3.

In certain embodiments, the polyetheramine has the structure of Formula XI-4:

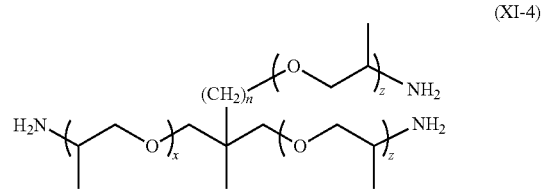

(XI-4)

wherein the total of x, y, and z is ranging from about 5 to about 100. In certain embodiments, the polyethertriamine is JEF- FAMINE® T-403, having the structure of Formula XI-4, wherein the total of x, y, and z is about 5 or about 6. In certain embodiments, the polyethertriamine is JEFFAMINE® T-3000, having the structure of Formula XI-4, wherein the total of x, y, and z is about 50. In certain embodiments, the polyethertriamine is JEFFAMINE® T-5000, having the structure of Formula XI-4, wherein the total of x, y, and z is about 85.

b. Polyanhydrides

In one embodiment, the polyanhydride is an alkyl polyanhydride, an alkenyl polyanhydride, an alkynyl polyanhydride, a cycloalkyl polyanhydride, an aryl polyanhydride, a heteroaryl polyanhydride, a heterocyclyl polyanhydride, or a mixture thereof, wherein the alkyl, alkenyl, alkynyl, cycloalkyl, aryl, heteroaryl, and heterocyclyl are each independently and optionally substituted, in one embodiment, with one or more substituents Q. In certain embodiments, the polyanhydride is an alkyl polyanhydride, optionally substituted, in one embodiment, with one or more substituents Q. In certain embodiments, the polyanhydride is an alkenyl polyanhydride, optionally substituted, in one embodiment, with one or more substituents Q. In certain embodiments, the polyanhydride is an alkynyl polyanhydride, optionally substituted, in one embodiment, with one or more substituents Q. In certain embodiments, the polyanhydride is a cycloalkyl polyanhydride, optionally substituted, in one embodiment, with one or more substituents Q. In certain embodiments, the polyanhydride is an aryl polyanhydride, optionally substituted, in one embodiment, with one or more substituents Q. In certain embodiments, the polyanhydride is a heteroaryl polyanhydride, optionally substituted, in one embodiment, with one or more substituents Q. In certain embodiments, the polyanhydride is a heterocyclyl polyanhydride, optionally substituted, in one embodiment, with one or more substituents Q.

In certain embodiments, the polyanhydride is a dianhydride. In certain embodiments, the dianhydride is a tetracarboxylic dianhydride. In certain embodiments, the dianhydride is an alkyl tetracarboxylic dianhydride, alkenyl tetracarboxylic dianhydride, alkynyl tetracarboxylic dianhydride, cycloalkyl tetracarboxylic dianhydride, aryl tetracarboxylic dianhydride, heteroaryl tetracarboxylic dianhydride, or heterocyclyl tetracarboxylic dianhydride, or a mixture thereof, wherein the alkyl, alkenyl, alkynyl, cycloalkyl, aryl, heteroaryl, and heterocyclyl are each independently and optionally substituted, in one embodiment, with one or more substituents Q.

In certain embodiments, the dianhydride is an alkyl tetracarboxylic dianhydride, optionally substituted, in one embodiment, with one or more substituents Q. In certain embodiments, the dianhydride is butanetetracarboxylic dianhydride; meso-1,2,3,4-butanetetracarboxylic dianhydride; or dl-1,2,3,4-butanetetracarboxylic dianhydride; or a mixture thereof.

In certain embodiments, the dianhydride is an alkenyl tetracarboxylic dianhydride, optionally substituted, in one embodiment, with one or more substituents Q.

In certain embodiments, the dianhydride is an alkynyl tetracarboxylic dianhydride, optionally substituted, in one embodiment, with one or more substituents Q.

In certain embodiments, the dianhydride is a cycloalkyl tetracarboxylic dianhydride, optionally substituted, in one embodiment, with one or more substituents Q. In certain embodiments, the dianhydride is cyclobutane tetracarboxylic dianhydride; 1,2,3,4-cyclopentane tetracarboxylic dianhydride; cyclohexane tetracarboxylic dianhydride; 1,2,3,4-cyclohexanetetracarboxylic dianhydride; cis-1,2,3,4-cyclohexanetetracarboxylic dianhydride; trans-1,2,3,4-cyclohexanetetracarboxylic dianhydride; bicyclo[2.2.2]octane-2,3,5,6-tetracarboxylic 2,3:5,6-dianhydride; bicyclo[2.2.2]oct-7-ene-2,3,5,6-tetracarboxylic dianhydride; bicyclo[2.2.1]-heptane-2,3,5,6-tetracarboxylic 2,3:5,6-dianhydride; (4arH,8acH)-decahydro-1,t,4t:5c,4-cyclohexene-1,1,2,2-tetracarboxylic 1,2:1,2-dianhydride; bicyclo[2.2.1]heptane-2-exo-3-exo-5-exo-tricarboxyl-5-endo-acetic dianhydride; bicyclo[4.2.0]oxetane-1,6,7,8-tetracarboxylic acid intramolecular dianhydride; or a mixture thereof.

In certain embodiments, the dianhydride is an aryl tetracarboxylic dianhydride, optionally substituted, in one embodiment, with one or more substituents Q. In certain embodiments, the dianhydride is 3,3',4,4'-diphenylsulfone-tetracarboxylic dianhydride; 4,4'-hexafluoropropylidene bisphthalic dianhydride; 1,3-bis(3,4-dicarboxyphenyl)-1,1,3,3-tetramethyldisiloxane dianhydride; pyromellitic dianhydride; benzenetetracarboxylic anhydride; 1,2,4,5-benzenetetracarboxylic anhydride; 1,2,3,4-benzenetetracarboxylic anhydride; 3,3',4,4'-benzophenone tetracarboxylic dianhydride; 3,3',4,4'-biphenyltetracarboxylic dianhydride; 2,3,3',4'-biphenyltetracarboxylic dianhydride; 2,2'-bis-(3,4 dicarboxyphenyl)hexafluoropropane dianhydride; 2,3,6,7-naphthalenetetracarboxylic dianhydride; 1,2,5,6-naphthalenetetracarboxylic dianhydride; 1,4,5,8-naphthalenetetracarboxylic dianhydride; 2,2'-bis(3,4-dicarboxyphenyl)propane dianhydride; bis(3,4-dicarboxyphenyl)sulfone dianhydride; 2,2'-bis-(3,4 dicarboxyphenyl)hexafluoropropane dianhydride; 4,4'-oxydiphthalic anhydride; 3,3',4,4'-diphenylsulfonetetracarboxylic anhydride; 4,4'-bisphenol A dianhydride; hydroquinone diphthalic anhydride; 4,4'-(hexafluoroisopropylidene)diphthalic anhydride; 4-(2,5-dioxotetrahydrofuran-3-yl)-1,2,3,4-tetranaphthalene-1,2-dicarboxylic anhydride; perylene-3,4,9,10-tetracarboxylic dianhydride; or a mixture thereof.

In certain embodiments, the dianhydride is pyromellitic dianhydride, 1,4,5,8-naphthalenetetracarboxylic dianhydride, 4,4'-(4,4'-isopropylidenediphenoxy)bis(phthalic anhydride), benzophenone-3,3',4,4'-tetracarboxylic dianhydride, or a mixture thereof. In certain embodiments, the dianhydride is pyromellitic dianhydride. In certain embodiments, the dianhydride is 1,4,5,8-naphthalenetetracarboxylic dianhydride. In certain embodiments, the dianhydride is 4,4'-(4,4'-isopropylidenediphenoxy)bis(phthalic anhydride). In certain embodiments, the dianhydride is benzophenone-3,3',4,4'-tetracarboxylic dianhydride.

In certain embodiments, the dianhydride is a mixture of 1,4,5,8-naphthalenetetracarboxylic dianhydride and benzophenone-3,3',4,4'-tetracarboxylic dianhydride. In certain embodiments, the dianhydride is a mixture of 1,4,5,8-naphthalenetetracarboxylic dianhydride and benzophenone-3,3',4,4'-tetracarboxylic dianhydride, wherein the molar ratio of 1,4,5,8-naphthalenetetracarboxylic dianhydride versus benzophenone-3,3',4,4'-tetracarboxylic dianhydride is ranging from about 1 to about 100, from about 2 to about 50, from about 5 to about 20, or from about 5 to about 15. In certain embodiments, the dianhydride is a mixture of 1,4,5,8-naphthalenetetracarboxylic dianhydride and benzophenone-3,3',4,4'-tetracarboxylic dianhydride, wherein the molar ratio of 1,4,5,8-naphthalenetetracarboxylic dianhydride versus benzophenone-3,3',4,4'-tetracarboxylic dianhydride is from about 5 to about 20. In certain embodiments, the dianhydride is a mixture of 1,4,5,8-naphthalenetetracarboxylic dianhydride and benzophenone-3,3',4,4'-tetracarboxylic dianhydride, wherein the molar ratio of 1,4,5,8-naphthalenetetracarboxylic dianhydride versus benzophenone-3,3',4,4'-tetracarboxylic dianhydride is from about 5 to about 15. In certain embodiments, the dianhydride is a mixture of 1,4,5,8-naphthalenetetracarboxylic dianhydride and benzophenone-3,3',4,4'-tetracarboxylic dianhydride, wherein the molar ratio of 1,4,5,8-naphthalenetetracarboxylic dianhydride versus benzophenone-3,3',4,4'-tetracarboxylic dianhydride is about 5, about 6, about 7, about 8, about 9, about 10, about 11, about 12, about 13, about 14, or about 15.

c. End-Capping Reagents

In one embodiment, the end-capping reagent is an activated carboxylic acid. In another embodiment, the end-capping reagent is an activated acetic acid. In yet another embodiment, the end-capping reagent is acetyl chloride. In yet another embodiment, the end-capping reagent is a carboxylic anhydride. In yet another embodiment, the end-capping reagent is a mono carboxylic anhydride. In yet another embodiment, the end-capping reagent is acetic anhydride. In yet another embodiment, the end-capping reagent is phthalic anhydride.

4.3 Methods for the Preparation of a Copolymer

In one embodiment, provided herein is a method for the preparation of a copolymer provided herein, comprising reacting a polyamine with a polyanhydride. In certain embodiments, the polyamine is a polyaminopolymer.

In certain embodiments, the reaction of the polyamine and polyanhydride is conducted at an elevated temperature. In certain embodiments, the reaction of the polyamine and polyanhydride is conducted in a solvent. In certain embodiments, the reaction of the polyamine and polyanhydride is conducted in a solvent at an elevated temperature.

In certain embodiments, the elevated temperature is ranging from about 30 to about 300° C., from about 50 to about 250° C., from about 100 to about 200° C., or from about 150 to about 200° C. In certain embodiments, the elevated temperature is ranging from about 30 to about 300° C. In certain embodiments, the elevated temperature is ranging from about 50 to about 250° C. In certain embodiments, the elevated temperature is ranging from about 100 to about 200° C. In certain embodiments, the elevated temperature is ranging from about 150 to about 200° C. In certain embodiments, the elevated temperature is about 100, about 110, about 120, about 130, about 140, about 150, about 160, about 170, about 180, about 190, or about 200° C.

In certain embodiments, the solvent is petroleum ether, pentane, hexane(s), heptane, octane, isooctane, cyclopentane, cyclohexane, methylcyclohexane, benzene, toluene, xylene, tetralin, cumene, mineral oil, dichloromethane (DCM), 1,2-dichloroethane, 1,1-dichloroethene, 1,2-dichloroethene, chloroform, trichloroethane, trichloroethene, carbon tetrachloride, chlorobenzene, trifluoromethylbenzene, methanol, ethanol, isopropanol (IPA), 1-propanol, 1-butanol, 2-butanol, t-butanol, 3-methyl-1-butanol, 1-pentanol, 2-methoxyethanol, 2-ethoxyethanol, ethyleneglycol, diethyl ether, diisopropyl ether, methyl t-butyl ether (MTBE), diphenyl ether, 1,2-dimethoxyethane, bi(2-methoxyethyl)ether, 1,1-dimethoxymethane, 2,2-dimethoxypropane, anisole, acetone, butanone, methyl ethyl ketone (MEK), methyl isopropyl ketone, methyl butyl ketone, methyl isobutyl ketone (MIBK), methyl acetate, ethyl formate, ethyl acetate, propyl acetate, isopropyl acetate, isobutyl acetate, butyl acetate, ethylene carbonate, propylene carbonate, formamide, N,N-dimethylformamide (DMF), N,N-dimethylacetamide, acetonitrile (ACN), dimethyl sulfoxide (DMSO), sulfolane, nitromethane, nitrobenzene, N-methyl pyrrolidone, 2-methyl tetrahydrofuran, tetrahydrofuran (THF), dioxane, pyridine, formic acid, acetic acid, trichloroacetic acid, trifluoroacetic acid, hexamethylphosphoramide, carbon sulfide, water; or a mixture thereof.

In certain embodiments, the solvent is a mineral oil, anisole, tetrahydrofuran, or a mixture thereof. In certain embodiments, the solvent is a mixture of a mineral oil and tetrahydrofuran. In certain embodiments, the solvent is a mixture of a mineral oil and anisole. In certain embodiments, the solvent is tetrahydrofuran. In certain embodiments, the solvent is anisole.

In certain embodiments, the reaction of the polyamine and polyanhydride is performed in the presence of a monoanhydride. In certain embodiments, the monoanhydride is phthalic anhydride. Without being bound to any theory, the monoanhydride is added herein in certain embodiments to affect or control the degree of chain extension.

In one embodiment, provided herein is a copolymer formed by reacting a polyamine and polyanhydride, wherein the polyamine comprises a polyaminopolyolefin.

In certain embodiments, the method further comprises the step of preparing a quasi-living polyaminopolyolefin.

In certain embodiments, conditions under which a quasi-living polymerization can be achieved, includes:

(1) an initiator, including, but not limited to, a tertiary alkyl halide, a tertiary aralkyl halide, a tertiary alkyl ether, a tertiary aralkyl ether, a tertiary alkyl ester, or a tertiary aralkyl ester;

(2) a Lewis acid co-initiator, including, but not limited to, a halide of titanium, boron, tin, or aluminum;

(3) optionally, a proton scavenger, proton trap and/or electron donor and/or common ion salt and/or common ion salt precursor;

(4) a solvent or cosolvent system whose dielectric constant is selected considering the choice of the Lewis acid and the monomer in accord with known cationic polymerization systems; and (5) monomers.

Additional examples of quasi-living living polymerizations can be found, for example, in U.S. Pat. Nos. 6,969,744; 7,420,019; 7,576,161; 7,705,090; 7,709,580; 8,013,073; 8,063,154; and 8,133,954; and U.S. Pat. App. Pub. Nos. 2009/0247716, 2010/0184918, 2010/0249001, 2010/0311915, 2011/0028681, and 2011/0306745, the disclosure of each of which is incorporated by reference herein in its entirety.

4.4 Lubricating Oil Compositions and Concentrates

In one embodiment, provided herein is a lubricating oil composition, comprising a lubricating oil and a copolymer of a polyamine and a polyanhydride as provided herein, wherein the polyamine comprises a polyaminopolyolefin. In certain embodiments, the copolymers of polyamine and polyanhydrides as provided herein are useful as detergent and dispersant additives in hydraulic fluids and crankcase lubricants.

In certain embodiments, the lubricating oil composition comprises from about 1% to about 20% by weight of a copolymer provided herein. In certain embodiments, the lubricating oil composition comprises from about 1% to about 10% by weight of a copolymer provided herein. In certain embodiments, the lubricating oil composition comprises about 1%, about 2%, about 3%, about 4%, about 5%, about 6%, about 7%, about 8%, about 9%, or about 10% by weight of a copolymer provided herein. In certain embodiments, the lubricating oil composition or concentrate comprises about 2%, about 3%, about 4%, about 5%, or about 6% by weight of a copolymer provided herein.

In certain embodiments, the lubricating oil in the lubricating oil composition is a mineral or synthetic oil of lubricating viscosity. In certain embodiments, the lubricating oil in the lubricating oil composition is a mineral or synthetic oil of lubricating viscosity suitable for use in the crankcase of an internal combustion engine. In certain embodiments, the lubricating oil in the lubricating oil composition is a crankcase lubricating oil. In certain embodiments, the crankcase lubricating oil has a viscosity ranging from about 1500 cSt at 0° F. (−17.8° C.) to about 10 cSt at 210° F. (99° C.) or from about 1300 cSt at 0° F. (−17.8° C.) to about 22.7 cSt at 210° F. (99° C.). In certain embodiments, the lubricating oil is a mineral oil. In certain embodiments, the mineral oil is paraffinic oil, naphthenic oil, or a mixture thereof. In certain embodiments, the lubricating oil is a synthetic oil. In certain embodiments, the synthetic oil is a hydrocarbon synthetic oil or a synthetic ester. In certain embodiments, the synthetic oil is a polymer of an alpha olefin having suitable viscosity. In certain embodiments, the synthetic oil is a hydrogenated liquid oligomer of a $C_{6-12}$ alpha olefin. In certain embodiments, the synthetic oil is 1-decene trimer. In certain embodiments, the synthetic oil is an alkyl benzene having suitable viscosity. In certain embodiments, the synthetic oil is didodecyl benzene. In certain embodiments, the lubricating oil is a synthetic ester. In certain embodiments, the synthetic ester is a monocarboxylic ester, polycarboxylic ester, an ester of a monohydroxy alkanol, or an ester of a polyol. In certain embodiments, the synthetic ester is didodecyl adipate, pentaerythritol tetracaproate, di-2-ethylhexyl adipate, dilaurylsebacate, or a mixture thereof. In certain embodiments, the synthetic ester is a complex ester prepared from a mixture of mono- and dicarboxylic acids and mono- and di-hydroxy alkanols. In certain embodiments, the lubricating oil is a blend of a hydrocarbon oil and synthetic oil. In certain embodiments, the lubricating oil is a blend comprising from about 10% to about 25% by weight of a hydrogenated 1-decene trimer and from about 75% to 90% by weight of a 150 SUS (100° F.) mineral oil as a lubricating oil base.

In certain embodiments, the lubricating oil composition further comprises one or more additional additives. In certain embodiments, the one or more additional additives are a detergent (overbased and non-overbased), a rust inhibitor, a foam inhibitor, a metal deactivator, a pour point depressant, an antioxidant, a wear inhibitor, a zinc dithiophosphate, or a mixture thereof.

In another embodiment, provided herein is an additive concentrate, comprising from about 90% to about 10% by weight, in one embodiment, from about 60% to about 20% by weight, of an organic liquid diluent and from about 10% to 90% by weight, in one embodiment, from about 40% to 20% by weight (on a dry basis) of a copolymer provided herein. In certain embodiments, the diluent for the concentrate provided herein is an oil of lubricating viscosity. In certain embodiments, the concentrate is mixed with a lubricating oil to prepare a lubricating oil composition. In certain embodiments, the lubricating oil that is as a diluent is one having a viscosity in the range from about 1300 cSt at 0° F. (−17.8° C.) to 22.7 cSt at 210° F. (99° C.).

4.5 Fuel Compositions and Concentrates

When used in a fuel, useful concentrations of a copolymer provided herein for obtaining the desired detergency is dependent upon various factors, including the type of the fuel used, the presence of additives, such as detergents and/or dispersants.

In one embodiment, provided herein is a fuel composition comprising a base fuel and a copolymer provided herein in the amount ranging from about 10 to about 10,000 weight parts per million, in one embodiment, from about 30 to about 5,000 weight parts per million.

In another embodiment, provided herein is a fuel concentrate, comprising an inert stable oleophilic solvent having a boiling point in the range of about 150-400° F. (65.6-204.4° C.), and a copolymer provided herein in the amount ranging from about 5 to about 70% by weight, in one embodiment, from about 5 to about 50% by weight, in another embodiment, from about 10 to 25% by weight. In certain embodiments, the solvent is an aliphatic or an aromatic hydrocarbon solvent. In certain embodiments, the solvent is benzene, toluene, xylene, or a higher-boiling aromatic or aromatic thinner. In certain embodiments, the solvent is a $C_{3-8}$ aliphatic alcohol. In certain embodiments, the solvent is a mixture of isopropanol, isobutylcarbinol, or n-butanol with a hydrocarbon solvent.

4.6 EXAMPLES

Example 1

Chain-Extension Reaction of a Difunctional PIB-amine with Phthalic Anhydride and/or Pyromellitic Dianhydride Comonomer A 4250 g/mol difunctional PIB-amine was synthesized utilizing the 5-tert-butyl-1,3-dicumyl chloride as an initiator and quenched with 3-phenoxypropylbromide. See U.S. Pat. Appl. Pub. No. US 2010/184918. The bromide termini were converted to azide by refluxing at 90° C. with sodium azide (6 eq.) in a heptane/dimethylformamide solvent mixture for 24 hours. The azide was then reduced to primary amine by chemical reduction using triphenylphosphine (2.2 eq.) refluxed in heptane/dimethylformamide at 90° C. for 18 hours. The reaction mixture was allowed to separate, and the heptane/polymer phase was washed with deionized water three times and the solvent was removed via a rotary evaporator to yield a difunctional PIB-amine (functionality=1.6 by titration).

Polymer 1-i. As a control, the difunctional PIB-amine (16.64 g, 3.92 mmol) was diluted with mineral oil (17.5 g). The mixture was diluted further with tetrahydrofuran (~100 mL). To this mixture was added phthalic anhydride (PA) (0.990 g, 6.68 mmol). The reaction mixture was slowly heated to 165° C. while stirring and the THF was distilled out in the process. The reaction was allowed to proceed for 1 hour, at which point vacuum was applied to the reaction to drive off any remaining water and solvent. The reaction was held at 0 mmHg for 30 additional minutes before cooling to room temperature.

Chain-Extended Polymer 1-ii. The difunctional PIB-amine (15 g, 3.53 mmol) was diluted with mineral oil (16 g) and reacted with phthalic anhydride (PA) (0.713 g, 4.82 mmol), which is used as a molecular weight-limiting agent, and pyromellitic dianhydride (PMDA) (0.131 g, 0.60 mmol) according to the method described hereinabove to form chain-extended polymer 1-ii.

Chain-Extended Polymer 1-iii. The difunctional PIB-amine (15 g, 3.53 mmol) was diluted with mineral oil (16 g) and reacted with phthalic anhydride (0.445 g, 3.00 mmol) and pyromellitic dianhydride (0.328 g, 1.50 mmol) according to the method described hereinabove to form chain-extended polymer 1-iii.

Chain-Extended Polymer 1-iv. The difunctional PIB-amine (15 g, 3.53 mmol) was diluted with mineral oil (16 g) and reacted with phthalic anhydride (0.222 g, 1.50 mmol) and pyromellitic dianhydride (0.491 g, 2.25 mmol) according to the method described hereinabove to form chain-extended polymer 1-iv.

Chain-Extended Polymer 1-v. The difunctional PIB-amine (15 g, 3.53 mmol) was diluted with mineral oil (16 g) and reacted with pyromellitic dianhydride (0.656 g, 3.00 mmol) according to the method described hereinabove to form chain-extended polymer 1-v.

The chain-extended polymers prepared were characterized and the results are summarized in Table 1. As shown in Table 1, the molecular weight of a chain-extended polymer increases as the proportion of the di-anhydride (comonomer) to the mono-anhydride (capper) increases. The degree of chain-extension is limited by the functionality of the polymer, which is slightly less than 2.0 in the polymers 1-i to 1-v.

TABLE 1

| Sample | PA:PMDA | Mn by GPC | PDI | Degree of Chain Extension |
|---|---|---|---|---|
| 1-i | 100:0 | 3,702 | 1.223 | N/A |
| 1-ii | 80:20 | 9,476 | 1.222 | 2.56 |
| 1-iii | 50:50 | 11,010 | 1.766 | 2.98 |
| 1-iv | 25:75 | 12,060 | 1.576 | 3.26 |
| 1-v | 0:100 | 17,280 | 2.140 | 4.67 |

Chain-extended polymer 1-v was top treated into base oil and evaluated for 2007A soot thickening bench test performance; and result is summarized in Table 2. In the 2007A bench test, a test oil (98.0 g) was weighed and VULCAN XCX-72® carbon black (2.0 g) was then added to the test oil. The test oil was a fully formulated oil containing detergents, zinc dithiophosphate and a viscosity index improver along with 6 wt % of a chain-extended polymer in diluent oil. The oil was left to soak for 16 hrs. The oil was then sheared for 60 sec. using a homogenizer and degassed in a vacuum oven for 30 min at 50-55° C. The viscosities of both a blank sample containing no carbon black and the sample treated with carbon black were determined at 100° C. The percentage increase was determined from the difference in average viscosities of the treated and untreated oil. A lower percentage increase in the viscosity indicates a relative improvement in dispersancy of the oil.

Example 2

Chain-Extension of a Difunctional PIB-amine with Dianhydride Comonomers

Chain-Extended Polymer 2-i. A 2900 g/mol difunctional PIB-amine was synthesized according the procedures as described in Example 1 (functionality=1.6). The PIB-amine ((15 g, 5.17 mmol) was then reacted with benzophenone-3, 3',4,4'-tetracarboxylic dianhydride (1.279 g, 3.97 mmol) according the procedures as described in Example 1.

Chain-Extended Polymer 2-ii. The 2900 g/mol difunctional PIB-amine (15 g) was reacted with 4,4'-(4,4'-isopropylidenediphenoxy)bis(phthalic anhydride) (2.066 g, 3.97 mmol) according the procedures as described in Example 1.

TABLE 2

| Polymer | Result (% viscosity increase) |
|---|---|
| 1-v | 170.32 |
| 2-i | 143.54 |
| 2-ii | 155.06 |
| 2-iii | 38.16 |
| 3-i | 6.18 |
| 3-ii | 16.03 |
| 3-iii | 20.32 |
| 3-iv | 17.96 |

Chain-Extended Polymer 2-iii. The 2900 g/mol difunctional PIB-amine (16 g, 5.52 mmol) was reacted with 1,4,5, 8-naphthalenetetracarboxylic dianhydride (1.131 g, 4.22 mmol) according the procedures as described in Example 1.

The chain-extended polymers were then top treated into base oil and evaluated for 2007A soot thickening bench test performance according to the procedures as described in Example 1; and the results are summarized in Table 2.

Example 3

Chain-Extension of a Difunctional PIB-amine with Dianhydrides and Polyetheramine Comonomers Chain-Extended Polymer 3-i. A 3900 g/mol difunctional PIB-amine was synthesized according the procedures as described in Example 1 (functionality=1.6). The PIB-amine (30 g, 7.69 mmol) was then diluted with mineral oil (32 g) and anisole (~100 mL). To the polymer mixture were added 1,4, 5,8-naphthalenetetracarboxylic dianhydride (1.462 g, 5.45 mmol) and benzophenone-3,3',4,4'-tetracarboxylic dianhydride (0.195 g, 0.605 mmol). The reaction was heated to 165° C. while stirring and the anisole was distilled out in the process. The reaction was allowed to proceed for 1 hour, at which point vacuum was applied to the reaction to drive off any remaining water and solvent. The reaction was held at 0 mmHg for 30 additional minutes before cooling to room temperature.

Chain-Extented Polymer 3-ii. To a mixture of the 3900 g/mol difunctional PIB-amine (30 g) in mineral oil (34 g) and anisole (~100 mL) were added D-400 JEFFAMINE® (1.32 g, 3.03 mmol), 1,4,5,8-naphthalenetetracarboxylic dianhydride (2.193 g, 8.18 mmol), and benzophenone-3,3',4,4'-tetracarboxylic dianhydride (0.293 g, 0.909 mmol). Chain-extended polymer 3-ii was synthesized according the procedures described above.

Chain-Extented Polymer 3-iii. To a mixture of the 3900 g/mol difunctional PIB-amine (30 g) in mineral oil (34 g) and anisole (~100 mL) were added XTJ-501 JEFFAMINE® (2.98 g, 2.98 mmol), 1,4,5,8-naphthalenetetracarboxylic dianhydride (2.193 g, 8.18 mmol), and benzophenone-3,3',4, 4'-tetracarboxylic dianhydride (0.293 g, 0.909 mmol). Chain-extended polymer 3-iii was synthesized according the procedures described above.

Chain-Extended Polymer 3-iv. To a mixture of the 3900 g/mol difunctional PIB-amine (30 g) in mineral oil (34 g) and anisole (~100 mL) were added D-2000 JEFFAMINE® (6.07 g, 3.04 mmol), 1,4,5,8-naphthalenetetracarboxylic dianhydride (2.193 g, 8.18 mmol), and benzophenone-3,3',4,4'-tetracarboxylic dianhydride (0.293 g, 0.909 mmol). Chain-extended polymer 3-iv was synthesized according the procedures described above.

The chain-extended polymers were then top treated into base oil and evaluated for 2007A soot thickening bench test performance according to the procedures as described in Example 1; and the results are summarized in Table 2.

It is understood that the detailed description and accompanying examples are merely illustrative and are not to be taken as limitations upon the scope of the subject matter. Various changes and modifications to the disclosed embodiments will be apparent to those skilled in the art. Such changes and modifications, including without limitation those relating to the chemical structures, substituents, derivatives, intermediates, synthesis, starting materials, products, and/or reaction conditions may be made without departing from the spirit and scope of thereof. Included within the scope of the subject matter described herein are all combinations of the embodiments described herein. All U.S. patents, patent applications, and patent publications referenced herein are incorporated herein by reference in their entireties.

What is claimed:

1. A copolymer of a polyamine that has two or more amino groups, and a polyanhydride that has two or more anhydride groups; wherein the polyamine comprises a polyaminopolyolefin; wherein the copolymer has the structure of Formula A:

$$R^5\text{-}(\text{-}X\text{-}Y\text{-})_n X\text{-}R^6 \quad (A)$$

wherein:
each X is independently alkylene, cycloalkylene, arylene, heteroarylene, heterocyclylene, or a divalent polymer group, provided that at least one of the X groups is a divalent polyolefin group;
each Y is independently a moiety containing two groups, each of which is independently amido or imido;
$R^5$ and $R^6$ are each independently amino, amido, or imido; and
n is an integer ranging from about 1 to about 100.

2. The copolymer of claim 1, wherein the polyamine is a polyaminopolymer or polyaminopolyisobutylene.

3. The copolymer of claim 1, wherein the polyaminopolyolefin is a quasi-living polyaminopolyolefin or quasi-living polyaminopolyisobutylene.

4. The copolymer of claim 1, wherein the polyaminopolyolefin has the structure of Formula I:

$$R^x\text{-}[\text{-}R^b\text{-}L\text{-}Z\text{-}(CR^1R^2)_m NH_2]_r \quad (I)$$

wherein:
each L is independently a bond, alkylene, alkenylene, cycloalkylene, arylene, heteroarylene, or heterocyclylene;
each Z is independently a bond, —O—, —S—, —$NR^z$—, —C(O)—, —$C(O)NR^z$—, —$OC(O)NR^z$—, —$NR^zC(O)NR^z$—, or —$NR^zC(NR^z)NR^z$—; where each $R^z$ is independently hydrogen or alkyl;
each $R^b$ is independently a divalent oligoolefin group;
$R^x$ is an initiator residue of functionality r;
each $R^1$ and $R^2$ is independently hydrogen, hydroxy, or alkyl;
each m is independently an integer ranging from about 0 to about 20; and
r is an integer ranging from about 2 to about 8;
wherein the alkyl, alkylene, alkenylene, cycloalkylene, arylene, heteroarylene, and heterocyclylene are each independently and optionally substituted.

5. The copolymer of claim 4, wherein each L is independently a bond, $C_{6-14}$ arylene, or 5-membered heteroarylene, wherein the arylene and heteroarylene are each independently and optionally substituted.

6. The copolymer of claim 4, wherein each L is independently a bond, phenylene, or pyrrolene, wherein the phenylene and pyrrolene are each independently and optionally substituted.

7. The copolymer of claim 4, wherein each L is 1,4-phenylene, optionally substituted.

8. The copolymer of claim 4, wherein Z is a bond, —O—, or —S—.

9. The copolymer of claim 4, wherein each $R^1$ is hydrogen or each $R^2$ is hydrogen.

10. The copolymer of claim 4, wherein m is an integer of 0, 1, 2, 3, 4, 6, or 11.

11. The copolymer of claim 4, wherein $R^b$ is a divalent oligoisobutylene group.

12. The copolymer of claim 4, wherein $R^b$ is a divalent oligoisobutylene group of —$[CH_2$—$C(CH_3)_2]_p$—, wherein p is an integer ranging from about 2 to about 10,000.

13. The copolymer of claim 12, wherein p is an integer from about 5 to about 100.

14. The copolymer of claim 4, wherein $R^x$ is an initiator residue of:

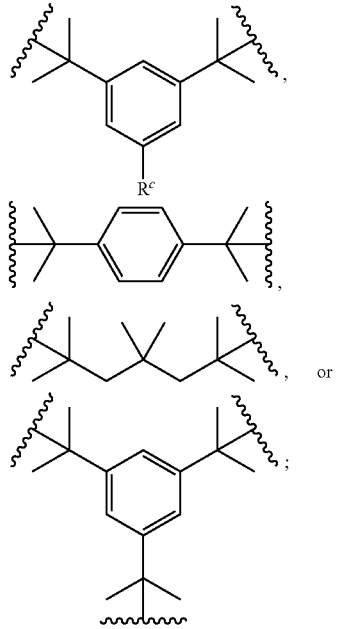

wherein $R^c$ is hydrogen or alkyl, wherein the alkyl is optionally substituted.

15. The copolymer of claim 14, wherein $R^c$ is hydrogen or t-butyl.

16. The copolymer of claim 4, wherein r is an integer of 2, 3, or 4.

17. The copolymer of claim 4, wherein r is 2.

18. The copolymer of claim 4, wherein the moiety -L-Z—$(CR^1R^2)_m NH_2$ is each independently:

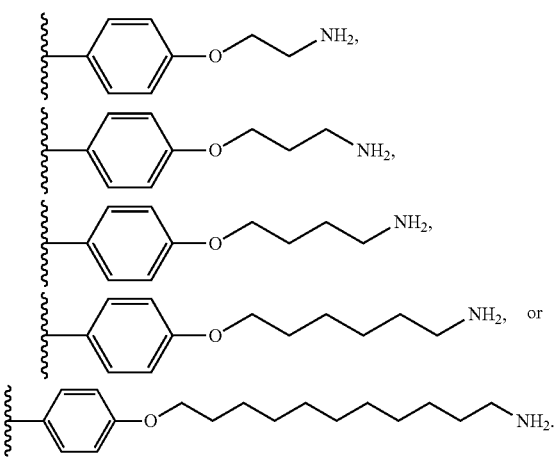

19. The copolymer of claim 4, wherein:
each L-Z is independently phenyleneoxy, pyrrolene, or —S—;
each $R^b$ is independently a divalent oligoisobutylene group of —$[CH_2$—$C(CH_3)_2]_p$—, wherein p is an integer ranging from about 5 to about 100;

R$^x$ is an initiator residue of:

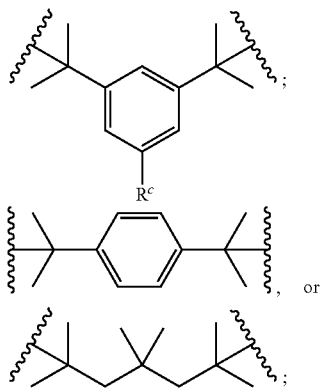

wherein R$^c$ is hydrogen or t-butyl;
each R$^1$ and R$^2$ is hydrogen;
each m is independently an integer ranging from about 2 to about 12; and
r is an integer of 2;
wherein the phenylene and pyrrolene are each independently and optionally substituted.

20. The copolymer of claim 1, wherein the polyanhydride is a dianhydride.

21. The copolymer of claim 20, wherein the dianhydride is an aryl dianhydride, optionally substituted.

22. The copolymer of claim 20, wherein the dianhydride is pyromellitic dianhydride, 1,4,5,8-naphthalenetetracarboxylic dianhydride, 4,4'-(4,4'-isopropylidenediphenoxy)bis(phthalic anhydride), benzophenone-3,3',4,4'-tetracarboxylic dianhydride, or a mixture thereof.

23. The copolymer of claim 2, wherein the polyaminopolymer is a polyaminopolyolefin.

24. The copolymer of claim 1, wherein the polyamine further comprises a polyetheramine.

25. The copolymer of claim 24, wherein the polyetheramine is a polyaminopoly(propylene oxide) or polyetherdiamine.

26. The copolymer of claim 24, wherein the polyetheramine is a polyetherdiamine of Formula XI-1:

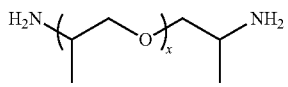

(XI-1)

wherein x is an integer ranging from about 2 to about 100.

27. The copolymer of claim 26, wherein x is an integer of about 6, about 33, or about 68.

28. The copolymer of claim 1, wherein the copolymer is a copolymer of a quasi-living diaminopolyisobutylene, and pyromellitic dianhydride, 1,4,5,8-naphthalenetetracarboxylic dianhydride, 4,4'-(4,4'-isopropylidenediphenoxy)bis(phthalic anhydride), benzophenone-3,3',4,4'-tetracarboxylic dianhydride, or a mixture thereof.

29. The copolymer of claim 1, wherein the copolymer is a copolymer selected from:
a copolymer of a quasi-living diaminopolyisobutylene and pyromellitic dianhydride;
a copolymer of a quasi-living diaminopolyisobutylene and 1,4,5,8-naphthalenetetracarboxylic dianhydride;
a copolymer of a quasi-living diaminopolyisobutylene and 4,4'-(4,4'-isopropylidenediphenoxy)bis(phthalic anhydride); and
a copolymer of a quasi-living diaminopolyisobutylene and benzophenone-3,3',4,4'-tetracarboxylic dianhydride.

30. The copolymer of claim 1, wherein the copolymer is a copolymer of a quasi-living diaminopolyisobutylene, polyetherdiamine, and pyromellitic dianhydride, 1,4,5,8-naphthalenetetracarboxylic dianhydride, 4,4'-(4,4'-isopropylidenediphenoxy)bis(phthalic anhydride), benzophenone-3,3',4,4'-tetracarboxylic dianhydride, or a mixture thereof.

31. The copolymer of claim 1, wherein the copolymer is a copolymer of a quasi-living diaminopolyisobutylene, polyetherdiamine, 1,4,5,8-naphthalenetetracarboxylic dianhydride, and benzophenone-3,3',4,4'-tetracarboxylic dianhydride.

32. The copolymer of claim 1, wherein the copolymer has a weight average molecular weight ranging from about 1,000 to about 50,000.

33. The copolymer of claim 1, wherein the copolymer has a polydispersity index of no greater than about 5.

34. The copolymer of claim 1, wherein each X is independently a divalent polyolefin group.

35. The copolymer of claim 1, wherein each X is independently

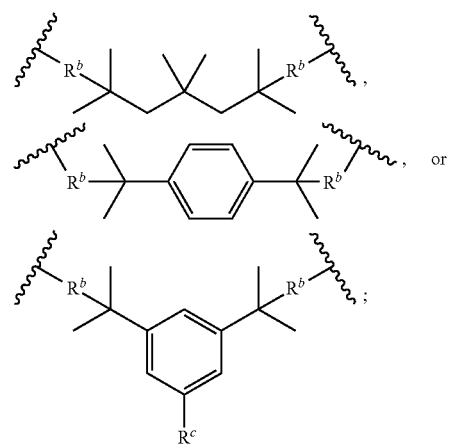

wherein each R$^b$ is independently a divalent oligoolefin group and R$^c$ is hydrogen or alkyl, optionally substituted.

36. The copolymer of claim 35, wherein R$^b$ is a divalent oligoisobutylene group.

37. The copolymer of claim 35, wherein R$^b$ is a divalent oligoisobutylene group of —[CH$_2$—C(CH$_3$)$_2$]$_p$—, wherein p is an integer from about 5 to about 100.

38. The copolymer of claim 35, wherein R$^c$ is hydrogen or t-butyl.

39. The copolymer of claim 1, wherein each Y is independently a divalent aryl group containing two imido groups.

40. The copolymer of claim 39, wherein each Y is independently

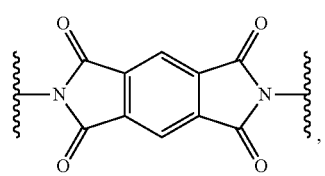

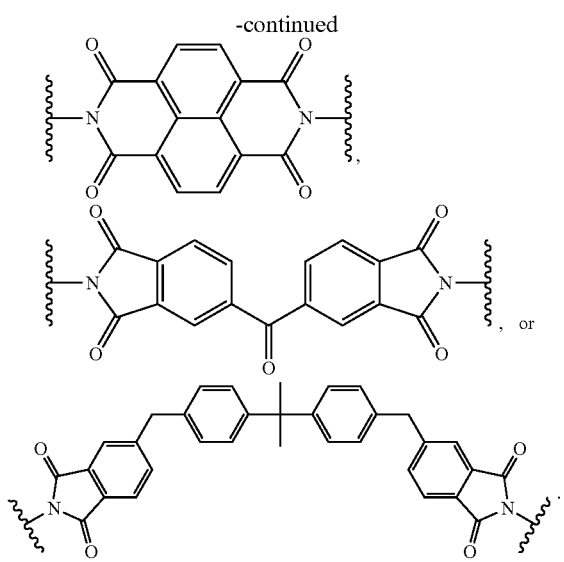

41. The copolymer of claim 1, wherein $R^5$ is amino, imido, or phthalimido.

42. The copolymer of claim 1, wherein $R^6$ is amino, imido, or phthalimido.

43. The copolymer of claim 1, wherein n is an integer ranging from about 1 to about 10.

44. The copolymer of claim 34, wherein each X is independently:

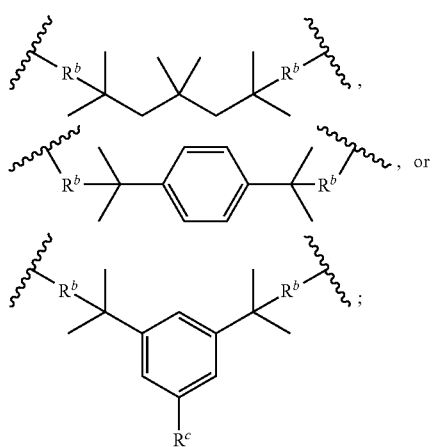

wherein a divalent oligoisobutylene group of $-[CH_2-C(CH_3)_2]_p-$, wherein p is an integer from about 5 to about 100; and $R^c$ is hydrogen or t-butyl;

each Y is independently

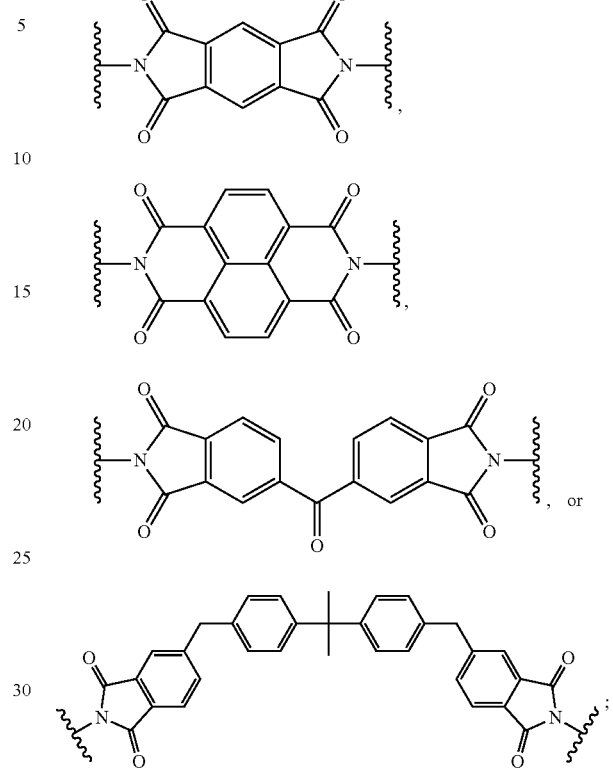

$R^5$ and $R^6$ are each independently $-NH_2$ or phthalimido; and n is an integer ranging from about 1 to about 10.

45. The copolymer of claim 1, wherein the copolymer has a number average molecular weight ranging from about 1,000 to about 50,000.

46. The copolymer of claim 1, wherein the copolymer has a polydispersity index of no greater than about 5.

47. The copolymer of claim 1, wherein the copolymer is formed by reacting the polyamine with the polyanhydride.

48. A lubricating oil composition comprising an oil of lubricating viscosity and the copolymer of claim 1.

49. A concentrate comprising from about 20 to 60 wt. % of the copolymer of claim 1 and from about 80 to about 40 wt. % of an organic diluent.

\* \* \* \* \*